(12) United States Patent
El-Kurdi et al.

(10) Patent No.: US 12,472,053 B2
(45) Date of Patent: Nov. 18, 2025

(54) MULTIPLE LAYER VASCULAR GRAFT

(71) Applicant: NEOGRAFT TECHNOLOGIES, INC., Taunton, MA (US)

(72) Inventors: Mohammed El-Kurdi, Mansfield, MA (US); Ryan Ayotte, Waltham, MA (US); Anh Thi Dinh, Brighton, MA (US); Kevin Farrell, New Smyrna Beach, FL (US); Jon McGrath, Duxbury, MA (US)

(73) Assignee: Xeltis AG, Zurich (CH)

( * ) Notice: Subject to any disclaimer, the term of this patent is extended or adjusted under 35 U.S.C. 154(b) by 448 days.

(21) Appl. No.: 17/058,776

(22) PCT Filed: Jun. 7, 2019

(86) PCT No.: PCT/US2019/036076
§ 371 (c)(1),
(2) Date: Nov. 25, 2020

(87) PCT Pub. No.: WO2019/237014
PCT Pub. Date: Dec. 12, 2019

(65) Prior Publication Data
US 2021/0196445 A1 Jul. 1, 2021

Related U.S. Application Data

(60) Provisional application No. 62/745,862, filed on Oct. 15, 2018, provisional application No. 62/682,766, filed on Jun. 8, 2018.

(51) Int. Cl.
*A61F 2/06* (2013.01)

(52) U.S. Cl.
CPC ........ *A61F 2/06* (2013.01); *A61F 2210/0076* (2013.01); *A61F 2250/0019* (2013.01); *A61F 2250/0071* (2013.01)

(58) Field of Classification Search
None
See application file for complete search history.

(56) References Cited

U.S. PATENT DOCUMENTS

| 6,537,567 B1* | 3/2003 | Niklason ................ C12M 21/08 435/395 |
| 2005/0137675 A1* | 6/2005 | Dubson .................... D01F 6/70 623/1.42 |

(Continued)

FOREIGN PATENT DOCUMENTS

WO WO2017073624 5/2017

OTHER PUBLICATIONS

Nezarati RM, Eifert MB, Dempsey DK, Cosgriff-Hernandez E. 2015. Electrospun vascular grafts with improved compliance matching to native vessels. J Biomed Mater Res Part B 2015:103B:313-323 (Year: 2015).*

*Primary Examiner* — Leslie A Lopez
(74) *Attorney, Agent, or Firm* — LUMEN PATENT FIRM

(57) ABSTRACT

Provided herein our graft devices for a patient comprising one or more layers, such as an inner layer and an outer layer. The inner layer comprises a first porous arrangement of fibers defining a first tube comprising an inner wall and an outer wall. The outer layer comprises a second porous arrangement of fibers defining a second tube comprising an inner wall and an outer wall. The second tube surrounds the first tube. A plurality of macropores extend through at least the inner and outer wall of the first tube. The inner and/or the outer layer can comprise a biofragmentable material configured to mechanically fracture into one or more fragments over time. Methods of creating graft devices are also disclosed.

8 Claims, 12 Drawing Sheets

(56) References Cited

U.S. PATENT DOCUMENTS

2007/0178221 A1 8/2007 Sims
2017/0151049 A1 6/2017 La Francesca

* cited by examiner

MULTIPLE LAYER VASCULAR GRAFT

CROSS-REFERENCE

This application claims the benefit of U.S. Provisional Application Nos. 62/682,766, filed Jun. 8, 2018, and 62/745,862, filed Oct. 15, 2018, each of which is incorporated herein by reference in its entirety.

RELATED APPLICATIONS

This application is related to:
U.S. Provisional Patent Application Ser. No. 62/682,766, filed Jun. 8, 2018;
U.S. patent application Ser. No. 13/979,243, filed Jul. 11, 2013;
U.S. patent application Ser. No. 14/354,025, filed Apr. 24, 2014;
U.S. patent application Ser. No. 14/378,263, filed Aug. 12, 2014;
U.S. patent application Ser. No. 14/851,946, filed Sep. 11, 2015;
U.S. patent application Ser. No. 15/023,265, filed Mar. 18, 2016;
U.S. patent application Ser. No. 15/036,304, filed May 12, 2016;
U.S. patent application Ser. No. 15/108,276, filed Jun. 24, 2016;
U.S. patent application Ser. No. 15/108,970, filed Jun. 29, 2016;
U.S. patent application Ser. No. 15/228,339, filed Aug. 4, 2016;
U.S. patent application Ser. No. 15/344,998, filed Nov. 7, 2016;
U.S. patent application Ser. No. 15/414,216, filed Jan. 24, 2017;
U.S. patent application Ser. No. 15/431,311, filed Feb. 13, 2017,
U.S. patent application Ser. No. 15/453,115, filed Mar. 8, 2017;
U.S. patent application Ser. No. 15/499,242, filed Apr. 27, 2017;
U.S. patent application Ser. No. 15/843,482, filed Dec. 15, 2017;
International Patent Application Serial Number PCT/US2016/067879, filed Dec. 20, 2016;
International Patent Application Serial Number PCT/US2017/036800, filed Jun. 9, 2017;
U.S. Pat. No. 9,445,874, issued Sep. 20, 2016;
U.S. Pat. No. 9,603,729, issued Mar. 28, 2017;
U.S. Pat. No. 9,622,849, issued Apr. 18, 2017;
U.S. Pat. No. 9,656,417, issued May 23, 2017; and
U.S. Pat. No. 9,867,690, issued Jan. 16, 2018;
the content of each of which is incorporated herein by reference in its entirety for all purposes.

FIELD OF THE INVENTION

The present invention relates generally to graft devices, and more particularly to graft devices for providing cardiovascular bypass for mammalian patients.

BACKGROUND

Diseases of the cardiovascular system are a leading cause of death in the United States, and approximately 550,000 vascular grafts are implanted yearly in the treatment of occlusive arterial disease. Although most grafting success has been realized through the use of autologous saphenous vein, the demand for autologous vein greatly exceeds availability. When autologous vessels are not available for grafting, synthetic polytetrafluoroethylene (PTFE) grafts are often used for applications requiring large-diameter (e.g. at least 6 mm) vessels, such as arteriovenous access for hemodialysis, or peripheral arterial bypass above the knee. Other types of grafts, such as decellularized bovine xenografts and human allograft vessels from cadavers, are prone to aneurysm, calcification, and thrombosis, and therefore, have not gained widespread clinical acceptance. In situations where small-diameter (e.g. approximately 4 mm) vessels are required, such as below the knee and for coronary artery bypass grafting, the patient's own vasculature (that is, internal mammary, radial, or gastroepiploic arteries and saphenous vein) is predominantly used because synthetic grafts and allografts have unacceptably low patency rates. Thus, a readily available, versatile vascular graft with good patency that is resistant to dilatation (chronic increase in diameter), calcification, thrombosis, and intimal hyperplasia would address a substantial and growing clinical need.

SUMMARY

For these and other reasons, there is a need for systems, methods and devices that provide enhanced graft devices for mammalian patients. The systems, methods, and devices can improve long term patency and reduce (e.g. minimize) surgical and device complications, such as those caused by kinking of graft devices, or those caused by insufficient durability of the graft leading to aneurysm formation.

Embodiments of the present inventive concepts can be directed to graft devices for mammalian patients, as well as systems and methods for producing these graft devices.

According to an aspect of the present inventive concepts, a graft device for a patient comprises: an inner layer comprising a first porous arrangement of fibers defining a first tube comprising an inner wall and an outer wall; an outer layer comprising a second porous arrangement of fibers defining a second tube comprising an inner wall and an outer wall, such that the second tube surrounds the first tube; and a plurality of macropores extending through at least the inner and outer wall of the first tube. The inner layer and/or the outer layer can comprise a biofragmentable material (e.g. one or more biofragmentable materials) that is configured to mechanically fracture into one or more fragments over time.

In some embodiments, the macropores are configured to accelerate endothelization of the graft device. The macropores can provide a path for micro-vessels to develop within the graft device.

In some embodiments, multiple macropores comprise an inner diameter between 10 μm and 200 μm. The multiple macropores inner diameter can be between 30 μm and 100 μm. The multiple macropores inner diameter can be between 50 μm and 60 μm. The multiple macropores can comprise similar inner diameters. The multiple macropores can comprise dissimilar inner diameters.

In some embodiments, the distance between multiple adjacent macropores is between 200 μm and 1500 μm.

In some embodiments, one or more macropores comprise a relatively uniform diameter along its length.

In some embodiments, one or more macropores comprise an inward and/or an outward taper angle. The taper angle can be approximately 7.5°.

In some embodiments, multiple macropores comprise macropores formed using a device selected from the group consisting of: a metal pin; a laser; a mechanical removal tool; an electric arc; a dissolvable material; a mandrel such as a mandrel with a negatively charged shell and positively charged features; and combinations thereof.

In some embodiments, the inner layer and the outer layer each comprise a durometer configured to provide strength and/or kink resistance to the graft device.

In some embodiments, at least one component of the inner layer comprises a durometer that is lower than a durometer of at least one component of the outer layer. The durometer of the at least one component of the inner layer can be between Shore 20A and Shore 90A, and the durometer of the at least one component of the outer layer can be between Shore 35D and Shore 70D. The durometer of the at least one component of the inner layer can be between Shore 40A and Shore 87A, and the durometer of the at least one component of the outer layer can be between Shore 40D and Shore 65D. The durometer of the at least one component of the inner layer can be between Shore 77A and Shore 85A, and the durometer of the at least one component of the outer layer can be between Shore 50D and Shore 60D.

In some embodiments, the inner layer and the outer layer each comprise a thickness configured to provide strength and/or kink resistance to the graft device.

In some embodiments, the inner layer comprises a thickness less than a thickness of the outer layer. The thickness of the inner layer can be between 200 µm and 800 µm, and the thickness of the outer layer can be between 300 µm and 1200 µm. The thickness of the inner layer can be between 300 µm and 600 µm, and the thickness of the outer layer can be between 500 µm and 900 µm. The thickness of the inner layer can be between 400 µm and 500 µm, and the thickness of the outer layer can be between 600 µm and 700 µm.

In some embodiments, at least one of the inner layer or the outer layer comprises at least one component comprising a microstructural morphology, the microstructural morphology comprising one or more fibers configured to resist premature environmental stress cracking. The one or more fibers can comprise a thickness between 1 µm and 20 µm. The one or more fibers can comprise a thickness between 5 µm and 10 µm.

In some embodiments, at least one of the inner layer or the outer layer comprises at least one component comprising a microstructural morphology, the microstructural morphology comprising a bulk pore size configured to promote cellular ingrowth and/or tissue integration with the graft device. The bulk pore size can be between 10 µm and 50 µm. The bulk pore size can be between 20 µm and 30 µm.

In some embodiments, at least one of the inner layer or the outer layer comprises at least one component comprising a microstructural morphology, the microstructural morphology comprising a bulk porosity configured to promote cellular ingrowth and/or tissue integration with the graft device. The bulk porosity can be between 30% and 90%. The bulk porosity can be between 40% and 60%.

In some embodiments, at least one of the inner layer or the outer layer comprises at least one component comprising a microstructural morphology, the microstructural morphology comprising a lumen surface configured to promote cellular ingrowth and/or tissue integration with the graft device. The lumen surface can comprise a plurality of pores comprising uniformly distributed sizes between 10 µm and 50 µm. The pore size can be between 20 µm and 40 µm.

According to another aspect of the present inventive concepts, a graft device for implantation in a vessel of a patient comprises: at least one of an inner layer comprising a first arrangement of fibers defining a first tube comprising an inner wall and an outer wall or an outer layer comprising a second arrangement of fibers defining a second tube comprising an inner wall and an outer wall. At least one of the inner or the outer layer comprises a biofragmentable material configured to mechanically fracture into one or more fragments over time.

In some embodiments, the graft device comprises the inner layer and the outer layer, and the second tube of the outer layer surrounds the first tube of the inner layer.

In some embodiments, the fragments are configured to remain integrated within remodeled tissue of the patient. The fragments can remain integrated for at least one year.

In some embodiments, the fragments remain integrated without exhibiting a substantial reduction of mass. The reduction of mass can comprise a reduction of no more than 20% of the initial mass. The reduction of mass can comprise a reduction of no more than 10% of the initial mass.

In some embodiments, the material comprises one or more PDMS-based polyether polyurethanes configured to fracture following an event selected from the group consisting of: embrittlement of the material due to oxidation; weakening of the material due to hydrolytic cleavage of the polyether soft segments; residual mechanical stresses present on the material fibers during electrospinning; an imposed mechanical stress that develops after implantation due to cellular infiltration, proliferation, and extracellular matrix synthesis; and combinations thereof.

In some embodiments, the material is manufactured using an electrospinning process configured to control at least one of the following material properties: porosity; pore-size; fiber surface area; fiber diameter; inter-fiber bonding area; inter-fiber bonding distance; and combinations thereof.

In some embodiments, the mechanical fracture of the material comprises environmental stress cracking. The presence of residual and/or imposed mechanical stresses on the material can accelerate environmental stress cracking. The absence of residual and/or imposed mechanical stresses on the material can decelerate environmental stress cracking.

In some embodiments, the material is configured to provide mechanical support to the graft device. The material can be configured to provide an initial level of mechanical support during a first period of time following implantation. The material can be configured to provide a subsequent level of mechanical support after the first period of time. The subsequent level of mechanical support can be less than the initial level of mechanical support. The first period of time can comprise approximately one year. The first period of time can comprise six months. The first period of time can comprise three months. The mechanical support can be configured to limit dilation of the graft device under stress from blood pressure.

In some embodiments, the graft device comprises a 2% secant modulus between 2 MPa and 16 MPa. The 2% secant modulus can be approximately 2 MPa, 4 MPa, 6 MPa, 8 MPa, 10 MPa, 12 MPa, 14 MPa, or 16 MPa.

In some embodiments, the graft device comprises a yield strength between 0.03 MPa and 0.4 MPa.

In some embodiments, the graft device comprises an ultimate strength between 2 MPa and 8 MPa.

In some embodiments, the graft device comprises a compliance range comprising a first compliance during a first period of time and a second compliance during a second period of time, and the second compliance is greater than the first compliance. The first compliance can comprise no more than 2%/100 mmHg and the second compliance can comprise at least 4%/100 mmHg. The first period of time can comprise at least 8 weeks.

In some embodiments, the graft device comprises an acute remodeling phase comprising between 0 and 30 days following implantation. A distention and/or a plastic dilation of the graft device under an arterial pressure can be limited during the acute remodeling phase. A higher velocity and an undisrupted blood flow within the graft device can be maintained during the acute remodeling phase. Macrophages and fibroblasts can penetrate the graft device during the acute remodeling phase.

In some embodiments, the graft device comprises a subchronic remodeling phase comprising between 30 and 180 days following implantation. The mechanical fracture can comprise a progressive fracture during the subchronic remodeling phase, and the fragments can be embedded within a continuum of highly vascularized fibrous tissue. An interior surface of a lumen of the graft device can comprise neointima stabilization and endothelium formation during the subchronic remodeling phase.

In some embodiments, the graft device comprises a chronic remodeling phase comprising at least 180 days following implantation. An interior surface of a lumen of the graft device can comprise neointima maturation and elastic laminae formation during the chronic remodeling phase.

In some embodiments, the graft device comprises an initial diameter of approximately 4.0 mm, 4.5 mm, 5.0 mm, 5.5 mm, 6.0 mm, 6.5 mm, 7.0 mm, 7.5 mm, or 8.0 mm.

In some embodiments, the graft device comprises an initial diameter of approximately 4.0 mm. The graft device can comprise a geometric baseline comprising 4.02±0.38 mm at 30 days following implantation. The graft device can comprise a remodeled diameter comprising 3.63±0.86 mm at 90 days following implantation. The graft device can comprise a remodeled diameter comprising 3.3±0.25 mm at 180 days following implantation. The graft device can comprise a remodeled diameter comprising 3.59±0.37 mm at 365 days following implantation.

DETAILED DESCRIPTION OF THE DRAWINGS

Figure 1:
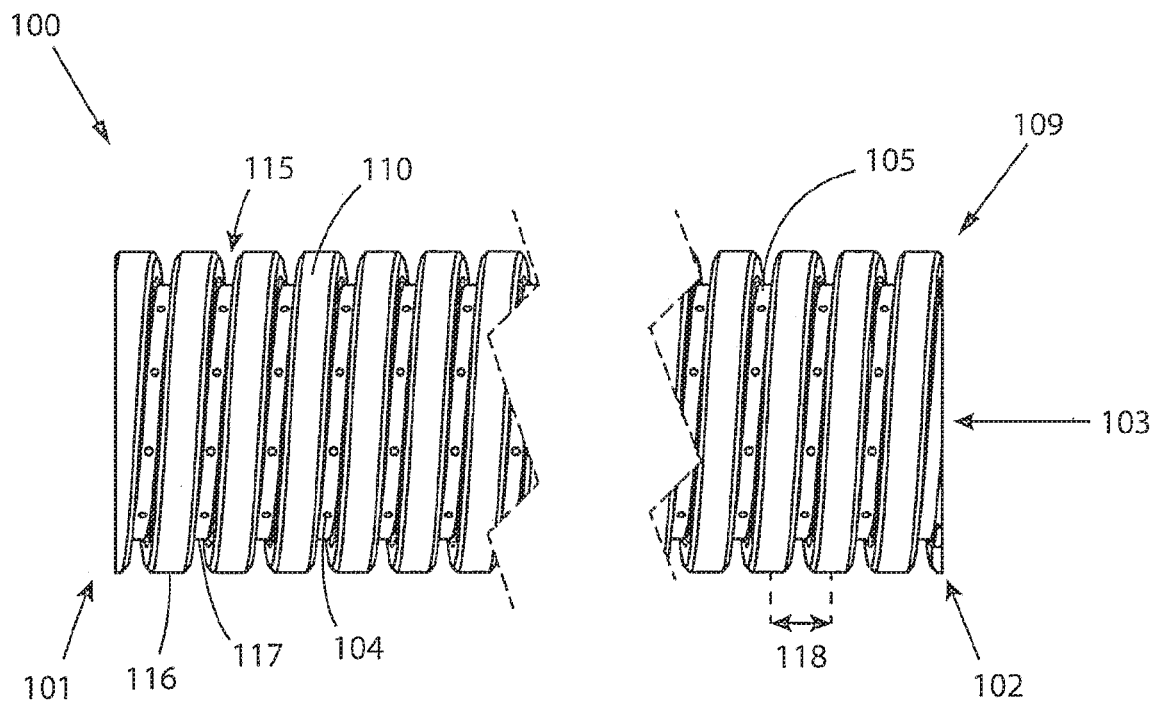
FIG. 1 illustrates a side view of a graft device, consistent with the present inventive concepts.

Reference will now be made in detail to the present embodiments of the technology, examples of which are illustrated in the accompanying drawings. Similar reference numbers may be used to refer to similar components. However, the description is not intended to limit the present disclosure to particular embodiments, and it should be construed as including various modifications, equivalents, and/or alternatives of the embodiments described herein.

It will be understood that the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") when used herein, specify the presence of stated features, integers, steps, operations, elements, and/or components, but do not preclude the presence or addition of one or more other features, integers, steps, operations, elements, components, and/or groups thereof.

It will be further understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on", "attached", "connected" or "coupled" to another element, it can be directly on or above, or connected or coupled to, the other element, or one or more intervening elements can be present. In contrast, when an element is referred to as being "directly on", "directly attached", "directly connected" or "directly coupled" to another element, there are no intervening elements present. Other words used to describe the relationship between elements should be interpreted in a like fashion (e.g. "between" versus "directly between," "adjacent" versus "directly adjacent," etc.).

It will be further understood that when a first element is referred to as being "in", "on" and/or "within" a second element, the first element can be positioned: within an internal space of the second element, within a portion of the second element (e.g. within a wall of the second element); positioned on an external and/or internal surface of the second element; and combinations of one or more of these.

As used herein, the term "proximate", when used to describe proximity of a first component or location to a second component or location, is to be taken to include one or more locations near to the second component or location, as well as locations in, on and/or within the second component or location. For example, a component positioned proximate an anatomical site (e.g. a target tissue location), shall include components positioned near to the anatomical site, as well as components positioned in, on and/or within the anatomical site.

Spatially relative terms, such as "beneath," "below," "lower," "above," "upper" and the like may be used to describe an element and/or feature's relationship to another element(s) and/or feature(s) as, for example, illustrated in the figures. It will be further understood that the spatially relative terms are intended to encompass different orientations of the device in use and/or operation in addition to the orientation depicted in the figures. For example, if the device in a figure is turned over, elements described as "below"

and/or "beneath" other elements or features would then be oriented "above" the other elements or features. The device can be otherwise oriented (e.g. rotated 90 degrees or at other orientations) and the spatially relative descriptors used herein interpreted accordingly.

The terms "reduce", "reducing", "reduction" and the like, where used herein, are to include a reduction in a quantity, including a reduction to zero. Reducing the likelihood of an occurrence shall include prevention of the occurrence. Correspondingly, the terms "prevent", "preventing", and "prevention" shall include the acts of "reduce", "reducing", and "reduction", respectively.

The term "and/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein.

In this specification, unless explicitly stated otherwise, "and" can mean "or," and "or" can mean "and." For example, if a feature is described as having A, B, or C, the feature can have A, B, and C, or any combination of A, B, and C. Similarly, if a feature is described as having A, B, and C, the feature can have only one or two of A, B, or C.

The expression "configured (or set) to" used in the present disclosure may be used interchangeably with, for example, the expressions "suitable for", "having the capacity to", "designed to", "adapted to", "made to" and "capable of" according to a situation. The expression "configured (or set) to" does not mean only "specifically designed to" in hardware. Alternatively, in some situations, the expression "a device configured to" may mean that the device "can" operate together with another device or component.

As used herein, the term "threshold" refers to a maximum level, a minimum level, and/or range of values correlating to a desired or undesired state. In some embodiments, a system parameter is maintained above a minimum threshold, below a maximum threshold, within a threshold range of values and/or outside a threshold range of values, to cause a desired effect (e.g. efficacious therapy) and/or to prevent or otherwise reduce (hereinafter "prevent") an undesired event (e.g. a device and/or clinical adverse event). In some embodiments, a system parameter is maintained above a first threshold (e.g. above a first temperature threshold to cause a desired therapeutic effect to tissue) and below a second threshold (e.g. below a second temperature threshold to prevent undesired tissue damage). In some embodiments, a threshold value is determined to include a safety margin, such as to account for patient variability, system variability, tolerances, and the like. As used herein, "exceeding a threshold" relates to a parameter going above a maximum threshold, below a minimum threshold, within a range of threshold values and/or outside of a range of threshold values.

As described herein, "room pressure" shall mean pressure of the environment surrounding the systems and devices of the present inventive concepts. Positive pressure includes pressure above room pressure or simply a pressure that is greater than another pressure, such as a positive differential pressure across a fluid pathway component such as a valve. Negative pressure includes pressure below room pressure or a pressure that is less than another pressure, such as a negative differential pressure across a fluid component pathway such as a valve. Negative pressure can include a vacuum but does not imply a pressure below a vacuum. As used herein, the term "vacuum" can be used to refer to a full or partial vacuum, or any negative pressure as described hereabove.

The term "diameter" where used herein to describe a non-circular geometry is to be taken as the diameter of a hypothetical circle approximating the geometry being described. For example, when describing a cross section, such as the cross section of a component, the term "diameter" shall be taken to represent the diameter of a hypothetical circle with the same cross-sectional area as the cross section of the component being described.

The terms "major axis" and "minor axis" of a component where used herein are the length and diameter, respectively, of the smallest volume hypothetical cylinder which can completely surround the component.

As used herein, the term "fluid" can refer to a liquid, gas, gel, or any flowable material, such as a material which can be propelled through a lumen and/or opening.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination. For example, it will be appreciated that all features set out in any of the claims (whether independent or dependent) can be combined in any given way.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Terms defined in the present disclosure are only used for describing specific embodiments of the present disclosure and are not intended to limit the scope of the present disclosure. Terms provided in singular forms are intended to include plural forms as well, unless the context clearly indicates otherwise. All of the terms used herein, including technical or scientific terms, have the same meanings as those generally understood by an ordinary person skilled in the related art, unless otherwise defined herein. Terms defined in a generally used dictionary should be interpreted as having meanings that are the same as or similar to the contextual meanings of the relevant technology and should not be interpreted as having ideal or exaggerated meanings, unless expressly so defined herein. In some cases, terms defined in the present disclosure should not be interpreted to exclude the embodiments of the present disclosure.

Embodiments of the present inventive concepts can be directed to graft devices for mammalian patients, as well as systems and methods for producing these graft devices.

Provided herein are graft devices for implantation in a mammalian patient, such as to carry fluids such as blood or other body fluids from a first anatomical location to a second anatomical location, such as from one location in an artery to another location in the same, or different, artery. The graft devices of the present inventive concepts provide reduced inflammation, intimal hyperplasia, and thrombosis. The graft devices can comprise a multilayer structure that enables a sequence of biological actions that, over time, result in the formation of an artery-like conduit. The graft devices can comprise a multiple layer polymer matrix with multiple levels of porosity, whose mechanical properties change when implanted in a useful way. The graft devices can include a temporary sealant, such as a hydrogel.

The vascular graft devices described herein can address deficiencies of currently available vascular grafts, including: attenuating destructive inflammation; attenuating intimal hyperplasia; and preventing thrombosis. Deficiencies can result in graft failure, which could result in additional medical interventions. The graft devices described herein can be composed of a uniform and/or non-uniform biofragmenting scaffold of controlled properties, with built-in strain relief, and a resorbable sealant. The blood contacting surface of the graft devices can be thromboresistant. The graft devices can be completely incorporated over time. That is, the patient's own cells can infiltrate and coat the graft device to replace and/or integrate the device within autologous host tissue that, chronically, can achieve autonomous function.

Following implantation of the graft device, a new blood vessel (e.g. a neo-artery or neo-vein) is progressively formed by remodeling mechanisms such as cellular infiltration, proliferation, fusion, differentiation and integration, followed by matrix synthesis and rearrangement. These mechanisms create a new structure that ultimately replaces a portion or the whole existing structure of the graft device, such as to support the flow of blood at arterial or venous pressures. In some embodiments, the graft devices described herein support host tissue remodeling exclusively via host-mediated regenerative processes, without the preliminary inclusion of cells or other biological factors (such as growth factors or other proteins) prior to implantation. In these embodiments, the graft device may not have been subjected to any mechanical preconditioning. The resulting remodeled neo-artery includes a confluent endothelium and structural smooth muscle layers, which can be contractile or synthetic and responsive to autonomic signals. The neo-artery can also include protein components such as multi-structural elastin and collagen fibers, proteoglycans and glycosaminoglycans, and can exhibit resilient and compliant mechanical properties sufficient to support arterial pressure and flow of blood for long periods of time. In some embodiments, the graft device is incorporated within tissue formed by a standard immune response leading to the formation of a mature fibrous collagenous capsule comprising mainly fibroblastic and myofibroblastic cellular components.

The graft devices of the present inventive concepts can include an inner layer and an outer layer. The inner layer and the outer layer can comprise different materials (e.g. biomaterials) of construction and can be configured to perform different functions and/or perform similar functions at different times (e.g. at different times after implantation into a patient). The inner layer and/or the outer layer can each comprise a fiber matrix, such as a fiber matrix including one or more sub-layers (hereinafter referred to simply as "layers"), such as layers comprising different materials and/or different arrangements of one or more materials. Each layer can be bioresorbable, biodegradable, biodurable, bioerodible, and/or biofragmentable.

As used herein, biodegradation comprises a process whereby a polymer material decomposes via chemical degradation in a gradual but continuous way as a result of hydrolysis and oxidation that may be mediated by enzymatic activity.

As used herein, bioresorption comprises a process whereby a decomposing polymer is cleared from the host via phagocytosis and/or lymphatic or venous transport to the lungs, kidney, or liver and finally excreted from the host.

As used herein, biofragmentation comprises a process by which the structural integrity of a graft device comprising a biomaterial (e.g. a graft device comprising a single layer or multiple layers of one or more biomaterials) diminishes due to a mechanical fracture of the biomaterial's structural components, thereby producing one, two, or more biomaterial fragments. The biomaterial fragments can be configured to remain integrated within the remodeled host tissue for a period of time, such as remaining integrated within the remodeled host tissue for at least one year, such as for at least two years, such as for at least three years. In some embodiments, the biomaterial fragments comprise one or more materials (e.g. one or more polymers) configured to remain integrated within the remodeled host tissue without exhibiting a substantial reduction of mass, such as a reduction of no more than 20% of the initial mass, such as no more than 10% of the initial mass. For example, the graft device can comprise a material comprising one or more PDMS-based polyether polyurethanes that exhibit a mechanical fracture as a result of one or more of the following events: embrittlement of the material due to oxidation; weakening of the material due to hydrolytic cleavage of the polyether soft segments; residual mechanical stresses present on the material fibers during electrospinning; an imposed mechanical stress that develops after implantation due to cellular infiltration, proliferation, and extracellular matrix synthesis; an imposed cyclic stress from the pulsatile arterial blood pressure; or combinations of these.

Residual and/or imposed mechanical stresses can accelerate environmental stress cracking (ESC) of biomaterials (e.g. polyether polyurethane biomaterials). ESC is a common cause of unexpected brittle failure of thermoplastic (e.g. amorphous) polymers. ESC can be dependent on a polymer's chemical makeup, bonding, crystallinity, surface roughness, molecular weight, and/or residual stress. ESC can occur at a decreased rate (e.g. a greatly decreased rate) in the absence of residual and/or mechanical stresses. ESC represents a mechanism of biofragmentation, and ESC enables a means with which to control the rate at which biofragmentation of a biomaterial occurs. For example, annealing of polymeric biomaterials can reduce residual stress and decelerate ESC. As another example, reducing the quantity of polyether soft segments (e.g. poly(ethylene oxide), poly(propylene oxide), poly(tetramethylene oxide), and poly(hexamethylene oxide)) in the polymer can reduce susceptibility to ESC. Additionally or alternatively, the architecture of the biomaterial can provide a means to alter the rate of biofragmentation. For example, manufacturing a biomaterial using an electrospinning process can provide a means to control at least one of the following biomaterial properties: porosity; pore-size; fiber surface area; fiber diameter; inter-fiber bonding area; inter-fiber bonding distance; and combinations of these. In some embodiments, the biomaterial comprises a porosity between 40% and 60%, such as to facilitate sufficient cellular infiltration to promote either uniform and/or non-uniform biofragmentation within the graft device. Additionally or alternatively, to further facilitate unencumbered cell migration into the biomaterial, the biomaterial can comprise a pore size between 20 µm and 30 µm and/or can comprise interconnected pores. Controlling the surface area and/or fiber diameter of the biomaterial architecture (e.g. area exposed to the in-vivo environment) can provide an additional means to alter the rate of biofragmentation. For example, increasing fiber diameter can attenuate ESC and thereby reduce the rate of biofragmentation. As another example, increasing inter-fiber bonding area and/or reducing the distance between inter-fiber bonds within the biomaterial can attenuate ESC and thereby reduce the rate of biofragmentation.

Once biofragmentation occurs, the integrated tissue can be exposed to increased levels of biomechanical stress, which can promote in-situ cellular differentiation and tissue maturation (e.g. extracellular matrix production, condensation, contraction, and strengthening). Further, the rate of biofragmentation can decelerate as the mechanical stress on the biomaterial fiber is reduced.

The enzymatic and cellular processes that occur during biofragmentation can break down, and subsequently eliminate, foreign material. The elimination of foreign material can reduce the size of the biomaterial fragments to allow for its transport via the lymphatic system. Biofragmentation can produce one or more fragments that remain integrated within the remodeled tissue for at least one year, such as for at least two years, such as for at least three years. Alternatively or additionally, one or more bioresorbable and/or biodegradable biomaterial fragments can be reduced in size and transported within macrophages and multinucleated giant cells through the lymphatic system, such that the bioresorbable and/or biodegradable fragments remain within the remodeled tissue for no more than one year, such as for no more than nine months, such as for no more than six months.

Each layer of the graft device can be configured to behave similarly or differently over different periods of time. Each layer can comprise one or more layers (e.g. sub-layers), such as one or more bioresorbable, biodegradable, biodurable, bioerodible and/or biofragmentable layers, or such as a layer comprising at least one biofragmentable layer and/or at least one biodurable layer. Each layer can comprise a fiber matrix that can be applied with one or more of: an electrospinning device; a melt-spinning device; a melt-electrospinning device; a misting assembly; a sprayer; an electrosprayer; a fuse deposition device; a selective laser sintering device; a three-dimensional printer; a braiding device; a knitting device; a weaving device; and/or other fiber matrix delivery device.

Incorporating one or more biofragmentable layers can enable the graft device to provide an initial level of mechanical support during a period of time following implantation but significantly less mechanical support after that period of time. In one embodiment the period of time comprises approximately one year. In another embodiment the period of time comprises six months. In another embodiment the period of time comprises three months. One or more biofragmentable layers can collectively (e.g. in combination with one or more other layers), or singly, provide sufficient mechanical support to prevent or otherwise limit significant dilation of the graft device under stress from blood pressure. The graft device can comprise a 2% secant modulus between 2 MPa and 16 MPa, such as between 2 MPa and 14 MPa, and such as between 3 MPa and 10 MPa. In some embodiments, the 2% secant modulus is approximately 2 MPa, 4 MPa, 6 MPa, 8 MPa, 10 MPa, 12 MPa, 14 MPa, or 16 MPa. The graft device can comprise a yield strength between 0.03 MPa and 0.4 MPa, such as between 0.05 MPa and 0.3 MPa, and such as between 0.07 MPa and 0.2 MPa. The graft device can comprise an ultimate strength between 2 MPa and 8 MPa, such as between 3 MPa and 5 MPa, and such as between 3.5 MPa and 4.5 MPa. These properties can be accomplished using conventional bioresorbing materials such as polylactic acid, polyglycolic acid, polycaprolactone, combinations of these, or other polymers that are hydrolytically unstable or enzymatically reactive. But polymers configured to resorb more quickly can elicit a stronger inflammatory response before the polymer is completely resorbed, which can result in accumulation of greater proliferative response.

The graft devices of the present inventive concepts can comprise a coronary arterial graft and/or a peripheral arterial graft (i.e. can be constructed and arranged to provide blood to a coronary artery and/or a peripheral artery of the patient). In a clinical procedure, end-to-side anastomotic connections are typically used to attach the graft device to a source of oxygenated blood on one end, and a diseased artery on the other (e.g. between the aorta and a diseased coronary artery in a coronary bypass procedure). Alternatively, a side-to-side anastomosis can be used, such as to attach the graft device to multiple diseased arteries in a serial fashion.

The graft devices of the present inventive concepts can include one or more features constructed and arranged to perform a function selected from the group consisting of: constrain blood in a relatively cylindrical shape and within a compliance range of no more than about 2%/100 mmHg, no more than about 5%/100 mmHg, or no more than about 8%/100 mmHg; to withstand arterial pressures (e.g. to withstand pressures of at least 180 mmHg without permanent dilation of more than about 5%); and combinations of these. The graft device can comprise a relatively cylindrical shape with an inner diameter comprising approximately ±5% of the diameter of the bypassed conduit.

In some embodiments, the graft devices comprise a compliance range that changes over time from a first compliance during a first period of time to a second compliance during a second period of time, and such that the second compliance is greater than the first compliance. The first compliance can comprise a compliance of no more than 5%/100 mmHg, such as no more than 4%/100 mmHg, such as no more than 3%/100 mmHg, such as no more than 2%/100 mmHg, such as no more than 1%/100 mmHg. The first period of time can comprise at least 8 weeks, such as at least 12 weeks, such as at least 16 weeks, such as at least 20 weeks, such as at least 26 weeks. The second compliance can comprise a compliance greater than the first compliance, such as a second compliance comprising at least 4%/100 mmHg, such as at least 6%/100 mmHg, such as at least 8%/100 mmHg, such as at least 10%/100 mmHg. The compliance range can change from a first (low) compliance range after a short period of implantation, to a second, higher compliance range after a longer period of implantation. For example, the compliance range can be no more than about 2%/100 mmHg within about 6 weeks of implantation, and more than about 2%/100 mmHg after about 26 weeks of implantation. As another example, the compliance range can be no greater than about 5%/100 mmHg within 12 weeks of implantation, and greater than about 5%/100 mmHg after 16 weeks of implantation.

In some embodiments, the diameter of the graft device is larger than the bypassed conduit to prevent an abrupt decrease in cross sectional area at the entrance to the graft. The inner diameter of the graft device can be about 2% larger than the inner diameter of the bypassed conduit, or about 4% larger than the inner diameter of the bypassed conduit, or no greater than about 6% larger than the inner diameter of the bypassed conduit. In some embodiments, there is a taper on (at least) the inner wall of the graft device that gradually decreases the inside diameter from the entrance to the exit of the graft, such as is shown in FIG. 1B. In some embodiments, the inner diameter of the graft device is approximately equal to the inner diameter of the conduit (e.g. blood vessel) to be bypassed. In some embodiments, the graft device is configured to provide increased strength and/or durability (e.g. tear resistance) in the region where a suture is placed to connect the graft device to a blood vessel (e.g. the aorta or the bypassed conduit). For example, the cylindrical wall cross-sectional area of the graft device adjacent to the proximal or distal end is greater than other areas of the graft device, or less porous than other areas of the graft device, or a greater inter-fiber bonding area than other areas of the graft device. In some embodiments, the cylindrical wall cross-sectional area of the graft device adjacent to the proximal or distal ends is approximately equal to the cross-sectional area (i.e. wall thickness) of the bypassed conduit. In some embodiments, the lumen cross-sectional area of the graft device adjacent to the proximal or distal ends is no greater than about 20% larger than the lumen cross-sectional area of the bypassed conduit. In some embodiments, the graft device is constructed and arranged to provide: axial and circumferential strength to withstand arterial pressures during neo-artery formation; kink resistance; sufficient durability; a composite and/or anisotropic construction; and combinations of these. In some embodiments, the graft device retains sufficient strength to prevent substantial dilation for a period of at least 12 weeks. In some embodiments, the graft device retains yield strength in the radial direction of at least 0.07 MPa after approximately 12 weeks, and/or retains no more than approximately 0.03 MPa after approximately 24 weeks.

Referring now to FIG. 1, a side view of a graft device is illustrated, consistent with the present inventive concepts. Graft device 100 comprises an inner layer 105 and an outer layer 110. In some embodiments, graft device 100 comprises either inner layer 105 or outer layer 110 (i.e. graft device 100 comprises a single layer such as is described herebelow in reference to FIG. 1B). Inner layer 105 can comprise an arrangement of fibers defining a first tube comprising an inner wall and an outer wall. Outer layer 110 can comprise an arrangement of fibers defining a second tube comprising an inner wall and an outer wall. Outer layer 110 can surround (e.g. circumferentially surround) inner layer 105 along the length of graft device 100. Graft device 100 further comprises a first end 101 and a second end 102, and it can be configured to be placed between a first body location and a second body location. Graft device 100 can include a lumen 103 that extends from first end 101 to second end 102, such as to carry blood or other fluid when graft device 100 is connected between the two body locations (e.g. between two blood vessels in an arterial bypass procedure). Graft device 100, inner layer 105, and/or outer layer 110 can each include one or more portions that exhibit permeability to a material, such as one or more materials selected from the group consisting of: oxygen; a cellular nutrient; biochemical signals; cells; water; blood; plasma; and combinations of these. In some embodiments, graft device 100 is of similar construction and arrangement to graft devices 100 of FIGS. 2 and 2A, and/or 3, as described herebelow.

Inner layer 105 and/or outer layer 110 can comprise one or more layers of fibers (e.g. one or more sub-layers of fibers) with a porosity configured to encourage host cell migration into inner layer 105 and/or outer layer 110, such as rapid cell infiltration, migration, proliferation, differentiation, and/or fusion, to support graft remodeling that leads to a strong, compliant neo-artery. Inner layer 105 can comprise a first porous arrangement of fibers and outer layer 110 can comprise a second porous arrangement of fibers. In some embodiments, inner layer 105 and outer layer 110 comprise similar porous arrangements of fibers (e.g. the first porous arrangement of fibers of inner layer 105 comprises a porosity that is similar to the porosity of the second porous arrangement of fibers of outer layer 110). In some embodiments, inner layer 105 and outer layer 110 comprise dissimilar porous arrangements of fibers (e.g. the first porous arrangement of fibers of inner layer 105 comprises a porosity that is more or less porous than the second porous arrangement of fibers of outer layer 110). In some embodiments, inner layer 105 and outer layer 110 comprise a single layer.

Inner layer 105 and/or outer layer 110 can comprise multiple holes, "macropores" herein, pores 104. Pores 104 can be positioned within an inner and/or outer sub-layer of inner layer 105 and/or outer layer 110. Multiple pores 104 (e.g. a majority of pores 104) can comprise an inner diameter $ID_P$ ranging from 10 µm to 200 µm, such as between 30 µm and 100 µm, such as between 50 µm and 60 µm. In some embodiments, multiple pores 104 (generally "pores 104") comprise a similar inner diameter. In some embodiments, multiple pores 104 comprise dissimilar inner diameters (e.g. the inner diameter can vary between pores 104). Pores 104 can be located (e.g. created or positioned within inner layer 105 and/outer layer 110) between approximately 200 µm and 1500 µm apart, such as between 400 µm and 1500 µm apart (e.g. as measured from center to center along an arc of the inner surface). Macroporosity of a vascular graft has been identified as a beneficial feature, configured to accelerate graft healing and/or endothelialization. The size of pores 104 can be selected to provide a path for micro-vessels to form a connection between the surrounding tissue capsule and lumen 103 (e.g. provide a path for micro-vessels to develop within graft device 100). Endothelial cells can populate lumen 103 via these micro-vessels. The spacing of pores 104 can be selected to allow the formation of a confluent endothelium (i.e. complete lumen 103 surface coverage with endothelial cells), indicating the final stage of healing.

Inner layer 105 and/or outer layer 110 can comprise one or more portions that have different properties (e.g. mechanical, physical and/or chemical properties) than one or more other portions of inner layer 105 and/or outer layer 110, respectively. In some embodiments, inner layer 105 and/or outer layer 110 comprise two or more portions that have a dissimilar property selected from the group consisting of: bioresorption rate; biodegradation rate; biofragmentation rate; structural design; surface energy; microstructural morphology; pore size and shape (e.g. macropore size and shape as described herebelow); permeability; anisotropy; lipophilicity; surface finish; elastic modulus; durometer; yield strength; elongation; ultimate strength; dimensions; and combinations of these.

Graft device 100 can comprise circumferential or other portions with increased longitudinal compliance configured to allow enhanced elongation (e.g. stretching) and/or kink resistance. In some embodiments, at least one component of one layer (e.g. inner layer 105 or outer layer 110) degrades and/or fragments at one rate (e.g. an average rate) during a first time period after implantation, and then degrades and/or fragments at a different rate during a subsequent, second time period. In some embodiments, at least one component of one layer degrades at a first rate during the first time period, and a lower, second rate, during the second time period. For example, degradation during the first time period can be above 8% per month during the first time period, and below 8% per month during the subsequent second time period. In some embodiments, at least one component of one layer (e.g. inner layer 105 or outer layer 110) retains at least 65% of the original yield strength after approximately 12 weeks of implantation, and retains less than 35% of the original yield strength approximately six months after implantation. In some embodiments, at least one component of one layer (e.g. inner layer 105 or outer layer 110) is configured to degrade and/or fragment at one rate when under stress and then degrade and/or fragment at a different, slower rate when under a relatively lower stress. For example, at least one component of one layer (e.g. inner layer 105 or outer layer 110) can comprise a polymer which is subject to oxidation and/or hydrolysis leading to more susceptibility to environmental stress cracking in-vivo.

At least one component of one layer (e.g. inner layer 105 or outer layer 110) can be constructed to provide strain-relief and/or kink resistance to graft device 100. In some embodiments, one or more grooves are cut into the outer layer 110, such as to provide kink resistance that is localized or uniform along the length of graft device 100. Alternatively or additionally, one or more extruded polymer filaments can be positioned between inner layer 105 and outer layer 110 to provide kink resistance that is localized or uniform along the length of graft device 100. The one or more filaments can comprise a configuration selected from the group consisting of: spirals; segments; individual rings; and combinations of these.

At least one component of one layer (e.g. inner layer 105 or outer layer 110) can comprise a hydrophobic material configured to promote protein adsorption and tissue integration. The hydrophobic material can comprise a water contact angle of greater than 65°, such as a water contact angle of greater than 90°, or such as a water contact angle greater than 110°. Alternatively or additionally, at least one component of one layer (e.g. inner layer 105 or outer layer 110) can comprise a hydrophilic material configured to promote thromboresistance. The hydrophilic material can comprise a water contact angle of no more than 65°, such as a water contact angle of no more than 40°.

Inner layer 105 and/or outer layer 110 can comprise a plurality of fibers comprising a fiber size between 1 and 20 microns, such as between 5 and 10 microns. Inner layer 105 and/or outer layer 110 can comprise interconnected and/or bonded fibers, such as to improve strength, reduce creep of inner layer 105 and/or outer layer 110, or resist premature environmental stress cracking (e.g. resist environmental stress cracking before a desired duration of time has elapsed). In some embodiments, inner layer 105 and/or outer layer 110 comprise inter-fiber bonds comprising an area ranging from 0 $\mu m^2$ to 700 $\mu m^2$, such as between 25 $\mu m^2$ and 300 $\mu m^2$. In some embodiments, inner layer 105 and/or outer layer 110 comprise inter-fiber bonds comprising an area ranging from 0 $\mu m^2$ to 100 $\mu m^2$, such as between 25 $\mu m^2$ and 75 $\mu m^2$. In some embodiments, inner layer 105 and/or outer layer 110 comprise inter-fiber bonds comprising an area of at least 20 $\mu m^2$, such as at least 30 $\mu m^2$, such as at least 40 $\mu m^2$, such as at least 50 $\mu m^2$, such as at least 60 $\mu m^2$. The inter-fiber bond density can affect the stiffness of the structure and/or the pore-size distribution, both of which can influence the susceptibility of the material to ESC. In some embodiments, pore size is configured to facilitate cellular infiltration. In some embodiments, inter-fiber bond density is configured to resist the imposed stress caused by cellular proliferation and extracellular matrix production. Inner layer 105 and/or outer layer 110 can comprise inter-fiber bonds separated by a distance ranging from 0 $\mu m$ to 50 $\mu m$, such as between 20 $\mu m$ and 30 $\mu m$. Inner layer 105 and/or outer layer 110 can comprise inter-fiber bonds separated by an approximate mean distance selected from the group consisting of: 3 $\mu m$; 5 $\mu m$; 10 $\mu m$; 15 $\mu m$; 20 $\mu m$; 25 $\mu m$; 30 $\mu m$; 35 $\mu m$; 40 $\mu m$; 45 $\mu m$; 50 $\mu m$; and combinations of these.

At least one component of one layer (e.g. inner layer 105 or outer layer 110) can comprise a microstructural morphology comprising one or more fibers further comprising a thickness between 1 $\mu m$ and 20 $\mu m$, such as between 5 $\mu m$ and 10 $\mu m$. The microstructural morphology can be configured to resist premature environmental stress cracking. Alternatively or additionally, at least one component of one layer (e.g. inner layer 105 or outer layer 110) can comprise a microstructural morphology comprising one or more fibers further comprising a circular cross section configured to optimally resist premature radially directed environmental stress cracking. In some embodiments, non-circular cross section fibers promote environmental stress cracking in a preferred direction. In some embodiments, at least one component of one layer (e.g. inner layer 105 or outer layer 110) comprises a microstructural morphology comprising inter-fiber bond areas greater than or equal to the square of the fiber diameter and configured to increase the bulk strength and/or stiffness of the layer. In some embodiments, the microstructural morphology comprises inter-fiber bond areas less than the square of the fiber diameter and configured to increase the bulk compliance of the layer. Outer layer 110 can comprise an inter-fiber bonding distance of between 0 $\mu m$ to 60 $\mu m$, such as between 15 $\mu m$ and 45 $\mu m$.

Under tension, the fibers can be configured to become more aligned in the direction of the applied force. The amount of alignment can be quantified by the average of angles between the fibers in any direction. The amount of alignment that occurs with a given force can be dependent on the fiber modulus, fiber thickness, number of fibers, and/or the starting alignment. Inner layer 105 can comprise an average angle between one or more fibers, and in a lengthwise direction, of between 20 and 70 degrees, such as between 30 and 55 degrees. Outer layer 110 can comprise an average angle between one or more fibers of between 0 and 70 degrees, such as between 20 and 45 degrees. In some embodiments, the angles between one or more fibers are configured to optimize strength and compliance with tensile forces. In some embodiments, inner layer 105 and/or outer layer 110 comprise an average degree of orientation between 30% and 80%. One or more of the oriented fibers can be configured to provide resistance to forces along the direction of the orientation. The fibers can be radially oriented to resist arterial pressure dilating the graft and/or can be axially oriented to resist elongation. In some embodiments, the average angle between one or more fibers are changed by pre-stressing the fiber matrix prior to use. For example, the fiber matrix can be stretched by between 1% and 5% of its starting length to increase orientation in the longitudinal direction to decrease subsequent orientation under applied load in use.

At least one component of one layer (e.g. inner layer 105 or outer layer 110) can comprise a microstructural morphology with bulk pore size between 10 $\mu m$ and 50 $\mu m$, such as between 20 $\mu m$ and 30 $\mu m$. The bulk pore size can promote cellular ingrowth and/or tissue integration with graft device 100. In some embodiments, at least one component of one layer (e.g. inner layer 105 or outer layer 110) comprises a microstructural morphology comprising a bulk porosity between 30% and 90%, such as between 40% and 60%. The bulk porosity can promote cellular ingrowth and/or tissue integration with graft device 100. The microstructural lumen surface morphology can comprise a plurality of uniformly distributed pore sizes between 10 $\mu m$ and 50 $\mu m$, such as between 20 $\mu m$ and 40 $\mu m$. The pore sizes can promote anchoring strength to the pseudointima and/or neointima.

At least one component of one layer (e.g. inner layer 105 or outer layer 110) can comprise radially directed macropores that are tapered inward, tapered outward, and/or relatively non-tapered (e.g. comprise a relatively uniform diameter along the length of the macropore). In some embodiments, one or more macropores taper outward (e.g. the macropore radius decreases in the outward radial direction), such as to improve the sealing strength of a hydrogel sealant (e.g. sealant 109 as described herebelow) and to require a higher pressure to dislodge the sealant from the macropore. In some embodiments, one or more macropores comprise a taper angle of at least 1°, or at least 3°, such as a taper angle of approximately 7.5°. The macropores can be configured to provide a path for establishing a vascular connection between the outer tissue capsule and the surface of lumen 103. Vascular connections through the macropores can supply endothelial cells, such as to populate lumen 103. In some embodiments, the macropores comprise an average inner diameter of between 10 µm and 200 µm, such as between 30 µm and 100 µm, such as between 50 µm and 60 µm.

At least one component of one layer (e.g. inner layer 105 or outer layer 110) can comprise a water permeability, prior to sealing, between 1 mL/minute/cm$^2$ and 3000 mL/minute/cm$^2$, such as between 1000 mL/minute/cm$^2$ and 2000 mL/minute/cm$^2$, such as between 1400 mL/minute/cm$^2$ and 1600 mL/minute/cm$^2$. Water permeability can facilitate transport of cells, biochemicals, and gasses through the wall of graft device 100.

At least one component of one layer (e.g. inner layer 105 or outer layer 110) can comprise isotropic or anisotropic elastic mechanical properties in the axial and/or circumferential directions, and/or under low and/or high levels of strain. In some embodiments, at least one component of one layer (e.g. inner layer 105 or outer layer 110) comprises an elastic modulus between 0.1 MPa and 10 MPa in the 0% to 50% levels of strain (e.g. in the circumferential and/or axial directions, such as between 0.2 MPa and 5 MPa, such as between 0.2 MPa and 1 MPa). In some embodiments, at least one component of one layer (e.g. inner layer 105 or outer layer 110) comprises an elastic modulus between 1 MPa and 20 MPa in the 50% to yield levels of strain (e.g. in the circumferential and/or axial directions), such as between 1 MPa to 10 MPa. The device elastic modulus can be configured to reproduce a range of arterial elastic moduli to reduce stress concentration in the anastomosis.

At least one component of one layer (e.g. inner layer 105 or outer layer 110) can comprise isotropic or anisotropic viscoelastic mechanical properties in the axial and/or circumferential directions, under low and/or high levels of strain, and/or under low and/or high actuation frequency. The Voight model viscosity constant of at least one component of one layer (e.g. inner layer 105 or outer layer 110) can comprise a level between 1 kPa·s and 1 MPa·s in the 0 Hz to 20 Hz actuation frequency range (e.g. in either the circumferential and/or axial directions), such as a level between 5 kPa·s and 100 kPa·s, such as between 20 kPa·s and 30 kPa·s. The viscosity constant can be configured to reproduce a range of arterial viscoelasticity to reduce stress concentration in the anastomosis.

At least one component of one layer (e.g. inner layer 105 or outer layer 110) can comprise a surface texture with a feature height and/or width between 1 µm and 50 µm, such as between 5 µm and 30 µm, such as between 10 µm and 20 µm. The surface texture dimensions can be configured to promote cellular adhesion, proliferation and synthesis, and otherwise mediate host tissue integration of biomaterials.

Inner layer 105 can comprise a durometer that is lower than a durometer of outer layer 110. In some embodiments, at least one component of inner layer 105 comprises a durometer between Shore 20A and Shore 90A, and at least one component of the outer layer 110 comprises a durometer between Shore 35D and Shore 70D. In some embodiments, at least one component of inner layer 105 comprises a durometer between Shore 40A and Shore 87A, and at least one component of the outer layer 110 comprises a durometer between Shore 40D and Shore 65D. In some embodiments, at least one component of inner layer 105 comprises a durometer between Shore 77A and Shore 85A, and at least one component of the outer layer 110 comprises a durometer between Shore 50D and Shore 60D. Inner layer 105 and outer layer 110 can each comprise a durometer configured to provide adequate strength and/or kink resistance to graft device 100.

Inner layer 105 can comprise a thickness that is less than a thickness of outer layer 110. In some embodiments, inner layer 105 comprises a thickness between 200 µm and 800 µm, and outer layer 110 comprises a thickness between 300 µm and 1200 µm. In some embodiments, inner layer 105 comprises a thickness between 300 µm and 600 µm, and outer layer 110 comprises a thickness between 500 µm and 900 µm. In some embodiments, inner layer 105 comprises a thickness between 400 µm and 500 µm, and outer layer 110 comprises a thickness between 600 µm and 700 µm. Inner layer 105 and outer layer 110 can each comprise a thickness configured to provide adequate strength and/or kink resistance to graft device 100.

Inner layer 105 can be more hydrophilic than outer layer 110. In some embodiments, inner layer 105 comprises a water contact angle between 0° and 65°, and outer layer 110 comprises a water contact angle between 50° and 130°. In some embodiments, inner layer 105 comprises a water contact angle between 20° and 50°, and outer layer 110 comprises a water contact angle between 65° and 120°. In some embodiments, inner layer 105 comprises a water contact angle between 30° and 40°, and outer layer 110 comprises a water contact angle between 90° and 110°. Inner layer 105 and outer layer 110 can each comprise a water contact angle configured to promote thromboresistance and tissue integration of graft device 100.

Alternatively, inner layer 105 can be more hydrophobic than outer layer 110. In some embodiments, inner layer 105 comprises a water contact angle between 50° and 130°, and outer layer 110 comprises a water contact angle between 0° and 65°. In some embodiments, inner layer 105 comprises a water contact angle between 65° and 120°, and outer layer 110 comprises a water contact angle between 20° and 50°. In some embodiments, inner layer 105 comprises a water contact angle between 90° and 100°, and outer layer 110 comprises a water contact angle between 30° and 40°. Inner layer 105 and outer layer 110 can each comprise a water contact angle configured to promote protein adsorption and adhesion resistance of graft device 100.

Inner layer 105 and/or outer layer 110 can further comprise a hydrogel sealant, sealant 109, such as a sealant selected from the group consisting of: partially or fully cross-linked gelatin; partially or fully crosslinked collagen; partially or fully crosslinked elastin; partially or fully polymerized fibrin; partially or fully crosslinked polyethylene glycol; partially or fully crosslinked polyethylene oxide; partially or fully crosslinked chondroitin sulfate; partially or fully crosslinked dermatan sulfate; partially or fully crosslinked heparan sulfate; partially or fully crosslinked alginate; partially or fully crosslinked albumin; and combinations of these. Inner layer 105 and outer layer 110 can be sealed with a gelatin hydrogel partially crosslinked with at least one of the following: glutaraldehyde; genepin; formaldehyde; transglutaminase; divinylsulfone; calcium chloride; and combinations of these.

Inner layer 105 can be sealed with a more durable hydrogel than outer layer 110. In some embodiments, inner layer 105 is sealed with a hydrogel configured to fully degrade between one month and six months, and outer layer 110 is sealed with a hydrogel configured to degrade between two weeks and four months. In some embodiments, inner layer 105 is sealed with a hydrogel configured to fully degrade between two months and four months, and outer layer 110 is sealed with a hydrogel configured to degrade between one month and three months. In some embodiments, inner layer 105 is sealed with a hydrogel configured to fully degrade between two months and three months, and outer layer 110 is sealed with a hydrogel configured to degrade between six weeks and two months. The hydrogel sealant durability for inner layer 105 and outer layer 110 can be configured to promote sealing against blood leakage and integration with surrounding tissue, respectively.

Alternatively, inner layer 105 can be sealed with a less durable hydrogel than outer layer 110. In some embodiments, inner layer 105 is sealed with a hydrogel configured to fully degrade between two weeks and four months, and outer layer 110 is sealed with a hydrogel configured to degrade between one month and six months. In some embodiments, inner layer 105 is sealed with a hydrogel configured to fully degrade between one month and three months, and outer layer 110 is sealed with a hydrogel configured to degrade between two months and four months. In some embodiments, inner layer 105 is sealed with a hydrogel configured to fully degrade between six weeks and two months, and outer layer 110 is sealed with a hydrogel configured to degrade between two months and three months. The hydrogel sealant durability for inner layer 105 and outer layer 110 can be configured to accelerate neointima formation, and to ensure adequate sealing during neointima formation, respectively.

Inner layer 105 can comprise a lower surface roughness than outer layer 110. In some embodiments, inner layer 105 comprises a surface roughness between an ISO grade scale (N) of N=6 to N=11, and outer layer 110 comprises a surface roughness of N=12. In some embodiments, inner layer 105 comprises a surface roughness of N=10, and outer layer 110 comprises a surface roughness between N=9 to N=11. In some embodiments, inner layer 105 comprises a surface roughness of between N=9 to N=10, and outer layer 110 comprises a surface roughness between N=10 to N=11. Inner layer 105 and outer layer 100 can each comprise a surface roughness configured to promote neointima formation and integration with surrounding tissue of graft device 100.

Inner layer 105 and outer layer 110 can comprise similar or dissimilar materials comprising similar or dissimilar properties selected from the group consisting of: durometer; modulus; molecular weight; molecular weight distribution; yield strength; ultimate tensile; elongation; creep resistance; stress relaxation resistance; and combinations of these. In some embodiments, inner layer 105 comprises a modulus 75% lower than the modulus of outer layer 110. For example, inner layer 105 can be configured with a lower modulus such as to be more compressible for increased kink resistance and outer layer 110 can maintain strength to hold structural integrity under deflection and arterial stress. In some embodiments, the elongation of inner layer 105 is 25% higher than outer layer 110 so as to optimize the axial flexibility and compliance of inner layer 105 and the dilation resistance of outer layer 110. In some embodiments, inner layer 105 comprises a lower stress-relaxation resistance than outer layer 110 to optimize the rate at which the neo-artery is exposed to arterial stress. For example, a lower stress relaxation resistance of inner layer 105 can allow for remodeling tissue growth to be gradually exposed to arterial stress until the remodeled tissue is fully developed and outer layer 110 can be more resistant to stress relaxation to maintain structural integrity until the neo-artery is fully developed.

Inner layer 105 and/or outer layer 110 can comprise one or more bioresorbable, biodegradable, biofragmentable and/or biodurable materials. In some embodiments, inner layer 105 is configured to biodegrade and/or biofragment at a first rate, and outer layer 110 is configured to biodegrade and/or biofragment at a second rate (e.g. different than the first rate). For example, outer layer 110 can be configured to biodegrade and/or biofragment at a slower rate than inner layer 105, such as to provide sustained radial support to inner layer 105 and any remodeling tissue structures contained within outer layer 110 to maintain the geometric or mechanical integrity of the tissue structures over time while exposed to arterial pressures. In some embodiments, outer layer 110 comprises a fiber matrix including a homopolymer with an average molecular weight of at least 30,000 Daltons and inner layer 105 comprises a fiber matrix including a homopolymer, a copolymer, an alloy of polymers, and/or a layered polymer of an average molecular weight comprising at least 10% greater than the molecular weight of outer layer 110. In some embodiments, the average molecular weight of outer layer 110 comprises at least 35,000 Daltons and inner layer 105 comprises an average molecular weight at least 10% greater than outer layer 110. In some embodiments, the average molecular weight of outer layer 110 comprises at least 40,000 Daltons and inner layer 105 comprises an average molecular weight at least 10% greater than outer layer 110. In some embodiments, outer layer 110 is constructed and arranged to remodel more rapidly into the functional components of blood vessels (e.g. endothelium formation, anti-thrombogenicity, and medial tissue development and/or vasoactivity), while inner layer 105 remodels more slowly into a structural component and provides sustained support for the blood vessel (e.g. to support arterial pressure) during its remodeling. In some embodiments, inner layer 105 comprises a fiber matrix including a homopolymer, a copolymer, an alloy of polymers, or a layered polymer and comprises an average molecular weight of at least 30,000 Daltons and outer layer 110 comprises a fiber matrix including at least a homopolymer of a molecular weight that is at least 10% greater than the molecular weight of the inner layer. In some embodiments, the average molecular weight of inner layer 105 comprises at least 35,000 Daltons and the outer layer is at least 10% greater. In some embodiments, the average molecular weight of inner layer 105 comprises at least 40,000 Daltons and outer layer 110 is at least 10% greater.

Figure 3:
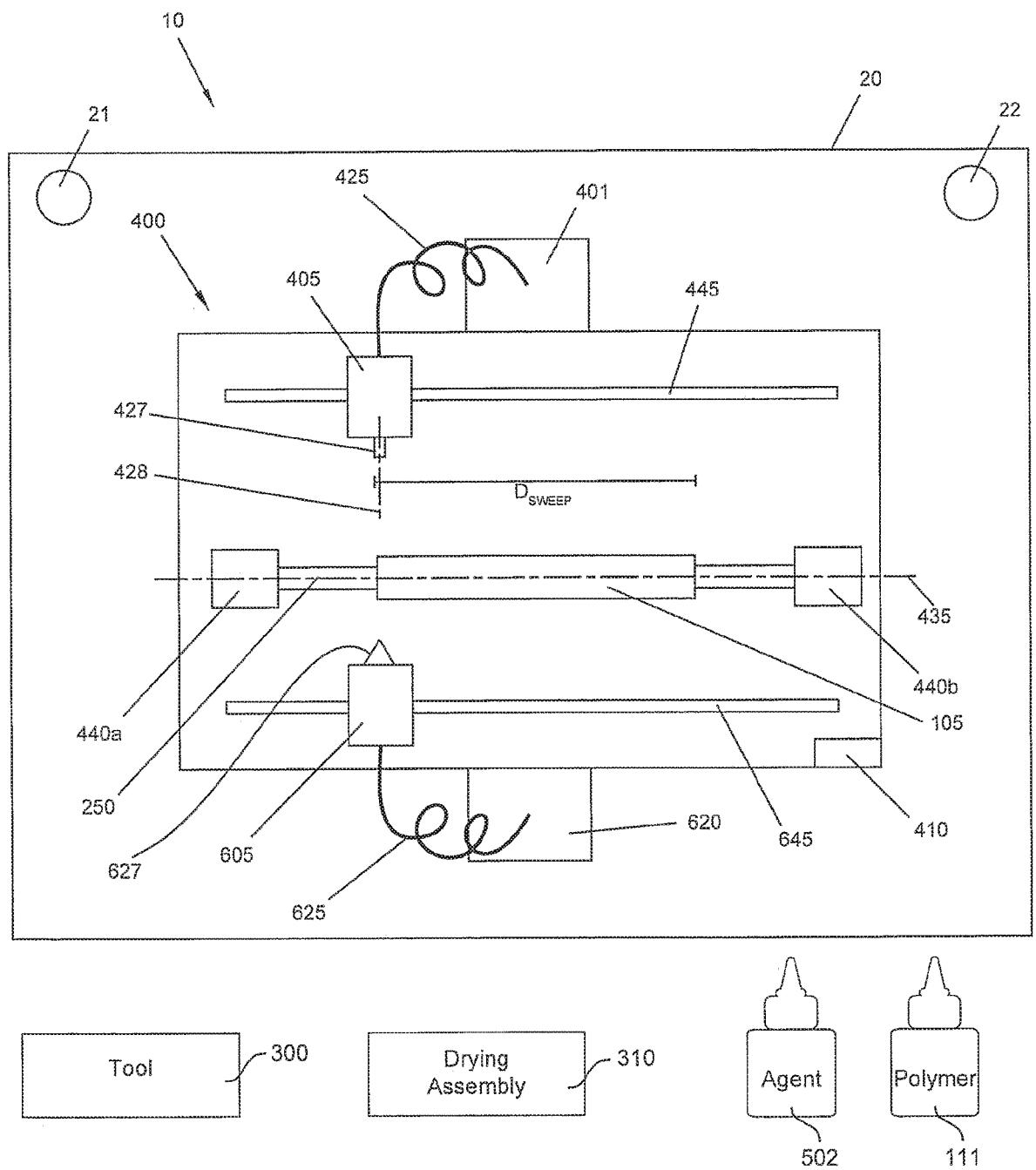
FIG. 3 illustrates a schematic view of an example system for producing a graft device, consistent with the present inventive concepts.

Graft device 100 can be manufactured using an electrospinning process, as described herebelow in reference to FIG. 3. The electrospinning unit utilizes a voltage field between a nozzle and a collector to create fibers from a polymer solution. The voltage of each the nozzle and the collector can influence how the fiber is made. In some embodiments, to control fiber deposition, the nozzle voltage can be controlled between 7 kV and 18 kV and the collector voltage between −0.5 kV to −3.5 kV. In some embodiments, to control fiber deposition, the nozzle voltage can be controlled from 5 kV to 20 kV and the collector voltage between 0 kV and −5 kV.

In some embodiments, inner layer 105 and outer layer 110 each comprise a multiple sub-layer (e.g. two or more sub-layers) concentric structure. Within each sub-layer, the properties of the fiber can be altered to affect the bioresorption, biodegradation and/or biofragmentation rate by changing a process variable or exposing the finished matrix to a variable aging environment, or both. For example, by changing the voltage applied to the nozzle during electrospinning, the force applied to the ejected fiber can be changed and the diameter (e.g. via voltage change) can also change. As the diameter changes, so can the susceptibility to degradation and/or biofragmentation (e.g. smaller diameter fibers being more susceptible than larger fibers). In some embodiments, the nozzle voltage is changed from at least 20 kV to no greater than 5 kV, leading to a progressive increase in fiber diameter during that period. In some embodiments, the nozzle voltage is changed from 18 kV to 7 kV. In some embodiments, the fiber diameter is selected by the polymer flow rate or viscosity. As the polymer flow rate decreases, the fiber diameter can also decrease and be more susceptible to bioresorption, biodegradation and/or biofragmentation.

Alternatively, the viscosity of the solution can be altered during the electrospinning process to control the fiber diameter. As the viscosity is decreased, the fiber diameter can also decrease and the fiber can be more susceptible to bioresorption, biodegradation and/or biofragmentation. This can be accomplished by changing the temperature of the solution or by increasing the dilution of the polymer in relation to the solvent concentration, or both. The temperature can be changed by interactively heating and/or cooling the vessel containing the solution, which can be accomplished in a variety of ways including circulation of a thermally conductive fluid, such as saline. The concentration of the polymer solution can be progressively changed by metering two syringes, each with different concentrations, into the nozzle concurrently. As the rate of the lower viscosity syringe is increased and the rate of the higher viscosity syringe is decreased, the combined viscosity can decrease, and the fiber size can decrease.

At least one fiber of inner layer 105 and/or outer layer 110 can comprise concentric layers comprising materials with at least one different property selected from the group consisting of: durometer; molecular weight; surface tension; elastic modulus; yield strength; elongation; and combinations of these. For example, a fiber can be a coextrusion of two different materials of a relatively similar or dissimilar wall thickness. In some embodiments, the multiple layer construction includes a middle layer with a slower bioresorption, biodegradation and/or biofragmentation rate than its two surrounding layers. In some embodiments, inner layer 105 and/or outer layer 110 comprise one or more materials that exhibit different oxidation and hydrolysis properties.

Inner layer 105 and/or outer layer 110 can comprise block copolymers of hard and soft segments. In some embodiments, inner layer 105 and/or outer layer 110 comprise a greater ratio of soft (e.g., polydimethylsiloxane (PDMS), either with or without PHMO added as a compatibilizer) to hard (e.g. methylene diphenyl diisocyanate (MDI)) segments. In some embodiments, inner layer 105 and/or outer layer 110 comprise 50% soft segments and 50% hard segments. In some embodiments, inner layer 105 and/or outer layer 110 comprise 60% soft segments and 40% hard segments. In some embodiments, inner layer 105 and/or outer layer 110 comprise 67.5% soft segments and 32.5% hard segments.

In some embodiments, inner layer 105 and/or outer layer 110 comprise biofragmentable, bioresorbable, biodegradable, bioerodible and/or biodurable materials selected from the group consisting of: Siloxane segmented thermoplastic polyurethane; aromatic polycarbonate silicone thermoplastic polyurethane; aliphatic polycarbonate silicone thermoplastic polyurethane; expanded polytetrafluoroethylene, polypropylene; polyethylene; polyether thermoplastic polyurethanes; silicone; polyester terephthalate; silicone polyurethane; polyether polycaprolactone; poly(Styrene-block amide-IsoButylene-block-Styrene); polyester urethane urea; polyglycerol sebacate; silk fibroin; PMMA; poly butylmethacrylatel; Cyanoacrylates; FEP; poly(etherketones); PEVA; Poly(olefins); PVDF; PLA; PLLA; PGA; PLGA; PEUU; P4HB; PEG; PEO; fibrin; gelatin; collagen; elastin; hyaluronic acid; chitosan; and combinations of these. In some embodiments, inner layer 105 and/or outer layer 110 comprises materials configured to facilitate biofragmentation and subsequent tissue integration, such as when inner layer 105 comprises a polymer comprising oxidizable polyether components (e.g. PHMO, PTMO), or hydrolysable components (e.g. polycarbonate).

Outer layer 110 can be constructed and arranged to circumferentially surround inner layer 105 in a spiral or otherwise helical geometry, such as is shown in FIG. 1, such that portions of inner layer 105 are exposed. In some embodiments, outer layer 110 is applied to completely surround inner layer 105, and subsequently, a tool (e.g. a saw or other tool as described herebelow) is used to remove one or more portions of outer layer 110 to create the desired geometry (e.g. creating groove 115 shown, comprising a spiral or otherwise helical recess in outer layer 110). In other embodiments, outer layer 110 is applied to inner layer 105 in a desired pattern without requiring a material removal step, such as when outer layer 110 is applied about inner layer 105 in the geometry shown (e.g. with groove 115 in place such as by using a 3D printer). Groove 115 of graft device 100 can be configured to provide kink resistance, provide exposure to inner layer 105, as well as other functions. In some embodiments, groove 115 comprises a series of multiple circumferential, partial, and/or segmented circumferential grooves positioned along outer layer 110. Groove 115 can comprise a geometry selected from the group consisting of: a clamshell; open and/or closed cell mesh; concentric rings; and combinations of these. In some embodiments, a desired geometry of groove 115 can be added or removed proximate to the time of implant. Groove 115 can be variable in pitch and/or thickness. In some embodiments groove 115 can be isolated to individual locations.

Groove 115 defines peaks 116 and valleys 117 shown. Peaks 116 can comprise a height ranging from 150 μm to 2000 μm, such as between 300 μm and 1000 μm. Valleys 117 can comprise a width ranging from 150 μm to 2000 μm, such as between 300 μm and 1000 μm. Pitch 118 can comprise a distance ranging from 400 μm to 4000 μm, such as between 600 μm and 2400 μm. Peaks 116 can be configured to prevent, or otherwise resist, an ovalization of device 100 by greater than 50% when device 100 is placed around a predetermined radius. The strength of peaks 116 can be directly proportional to the polar moment of inertia (I) of the cross section multiplied by a constant depending on the inside diameter of device 100. In some embodiments, a smaller diameter device 100 (e.g. a device with a diameter of no more than 6 mm) comprises lower peak 116 heights, smaller valley 117 widths, and lower pitch 118 distances. In some embodiments, a larger diameter device 100 (e.g. a device with a diameter of at least 6 mm) comprises higher peak 116 heights, larger valley 117 widths, and greater pitch 118 distances. Pores 104 can be positioned in peaks 116 and/or valleys 117.

Lumen 103 can comprise a diameter ranging from 3 mm to 30 mm, such as between 4 mm and 6 mm. In some embodiments, lumen 103 and/or outer layer 110 comprise a surface with a relatively uniform diameter along the length of graft device 100. In some embodiments, lumen 103 and/or outer layer 110 comprise a surface with a variable diameter, such as a tapered profile along at least a portion of graft device 100.

While graft device 100 of FIG. 1 is shown as a continuous, single tube construction, in some embodiments, graft devices can include multiple tubular segments such as a graft device including a bifurcation, a trifurcation, quadrification, or other construction including one or more inflow tubes that are connected to one or more outflow tubes.

Figure 1A:
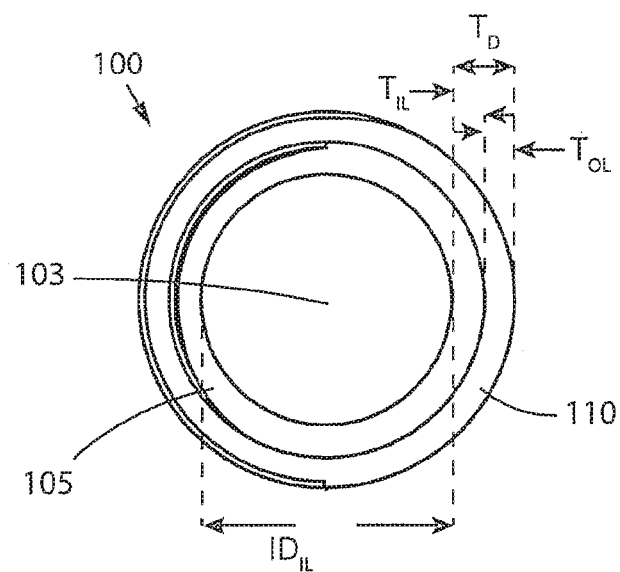
FIG. 1A illustrates an end view of the graft device of FIG. 1, consistent with the present inventive concepts.
Figure 1B:
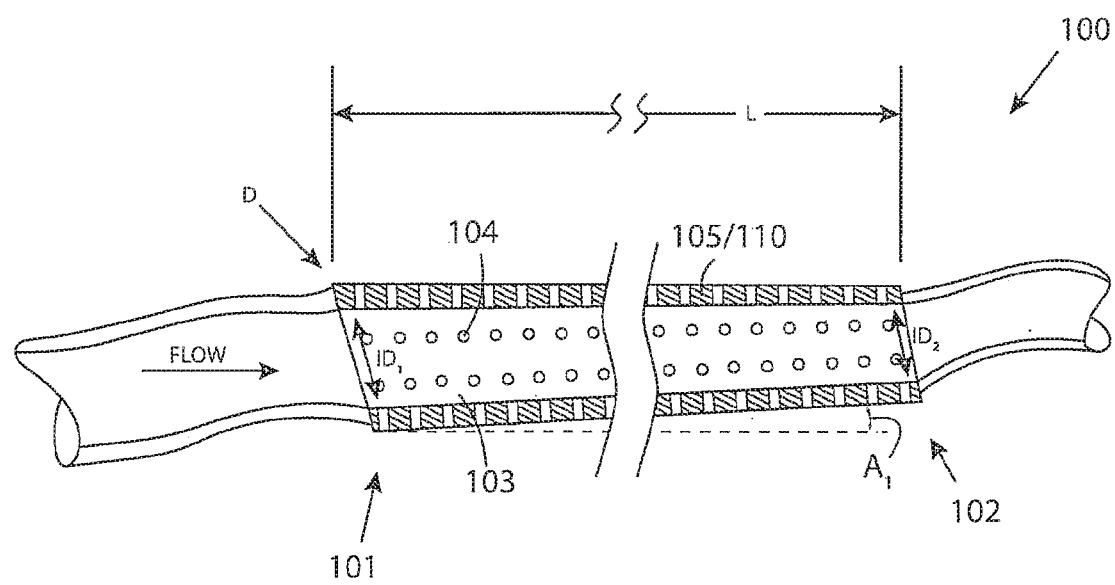
FIG. 1B illustrates a side, sectional view of a graft device including a tapered profile, consistent with the present inventive concepts.

Referring additionally to FIG. 1A, an end view of the graft device of FIG. 1 is illustrated, consistent with the present inventive concepts. Graft device 100 comprises a thickness TD and an inner diameter IDIL. In some embodiments, graft device 100 comprises a thickness TD ranging from 300 µm to 2500 µm, such as between 350 µm and 1050 µm. In some embodiments, graft device 100 comprises an inner diameter IDIL ranging from 3 mm to 30 mm, such as between 4 mm and 6 mm. Inner layer 105 comprises a thickness TIL and outer layer 110 comprises a thickness TOL. In some embodiments, inner layer 105 comprises a thickness TIL ranging from 300 µm to 2000 µm, such as between 350 µm and 400 µm, and outer layer 110 comprises a thickness TOL ranging from 700 µm to 2000 µm, such as between 750 µm and 850 µm. Graft device 100 thickness TD can consist of inner layer 105 thickness TIL combined with outer layer 110 thickness TOL.

The following paragraphs describe an example method of creating graft device 100. Graft device 100, comprising inner layer 105 and outer layer 110, can be produced using one or more tools and/or other devices, such as the graft devices described herebelow in reference to system 10 of FIG. 3.

Inner layer 105 can comprise one or more materials applied to a mandrel, mandrel 250 described herebelow. The one or more materials can be applied (e.g. in an electrospinning process) until inner layer 105 comprises a tubular fiber matrix with a desired length and thickness. Subsequently, outer layer 110 can be produced by applying one or more materials to surround inner layer 105 (e.g. to surround all or a portion of inner layer 105, such as when inner layer 105 remains positioned about mandrel 250) until outer layer 110 comprises a surrounding fiber matrix with a desired length and thickness.

Subsequently, one or more portions of outer layer 110 can be removed (e.g. via a saw, laser, and/or other cutting tool). In some embodiments, a rectangular-shaped, a V-shaped, or otherwise shaped groove, groove 115 shown, is created along all or a portion of the length of outer layer 110, creating peaks 116 and valleys 117. Groove 115 can comprise a groove helically positioned along device 100, such as a groove with constant and/or varying pitch. Groove 115 can pass through all (as shown in FIG. 1) or just a portion of the wall of outer layer 110. In some embodiments, the groove 115 passes through all of the wall of outer layer 110 (e.g. groove 115 extends from the outer wall to the inner wall of outer layer 110) and can extend at least partially into inner layer 105 (e.g. groove 115 extends into at least the outermost portion of inner layer 105). In some embodiments, groove 115 does not pass all the way through the wall of outer layer 110. In some embodiments, a groove (e.g. a second groove in addition to groove 115 of outer layer 110) is made in inner layer 105 (e.g. a groove extending from the inner wall of inner layer 105).

Pores can be formed and/or created in graft device 100, such as pores 104 shown and described hereabove. Pores 104 can be positioned at one or more locations, such as pores 104 that extend from valleys 117 through inner layer 105 to lumen 103, such as is described hereabove. Pores 104 can be formed and/or created in graft device 100 (e.g. inner layer 105 and/or outer layer 110) according to, but not limited to, the following methods: heating a metal pin past the melting point of graft device 100 and inserting it through graft device 100, thereby melting an opening as pore 104; using a laser to ablate the material in graft device 100, thereby creating pore 104; a mechanical removal tool, such as a drill, to remove material from graft device 100, thereby creating pore 104; an electric arc bridged between lumen 103 and the outer surface of graft device 100, thereby creating pore 104; a dissolvable material printed on a mandrel in the shape of pore 104 before manufacturing of graft device 100 (e.g. manufacturing via electrospinning, such that once electrospinning is completed, the material is dissolved and the top of the electrospun matrix is removed, thereby forming pore 104; or a mandrel, such as a mandrel having a negatively charged shell and positively charged features (e.g. dots) on the surface of the mandrel, such that during electrospinning, the positively charged features prevent the fibrous matrix from being deposited in the area, thereby forming pore 104.

Graft device 100 can be submersed in a gelatin solution after creation of pores 104. In some embodiments, a vacuum is applied (e.g. via a vacuum trap) to remove air within graft device 100. In some embodiments, a vacuum is applied (e.g. via a vacuum trap) to distribute the gelatin solution throughout graft device 100, such as to promote a uniform application of the gelatin solution to graft device 100. In some embodiments, a sonication force is applied to distribute the gelatin solution throughout graft device 100. In some embodiments, the gelatin solution further comprises a crosslinking agent (e.g. glutaraldehyde). The gelatin solution can be incorporated into graft device 100, such as to fill pores 104 and/or grooves 115. In some embodiments, one or more grooves 115 are at least partially filled with a gelatin solution, such as one or more grooves 115 are completely filled with a gelatin solution. In some embodiments, one or more grooves 115 are not filled with a gelatin solution. In some embodiments, a layer of gelatin solution is on the inner and/or outer surface of graft device 100. In some embodiments, no gelatin is on the inner and/or outer surface of graft device 100.

Graft device 100 can be configured to be completely incorporated within host tissue over time. The patient's cells can infiltrate, proliferate, and/or synthesize the extracellular matrix within graft device 100 to remodel with autologous tissue. The mechanical properties of the structural, non-resorbable scaffold can provide sufficient durability during the period of remodeling to prevent dilation. Subsequently, the scaffold can become mechanically disrupted (i.e. biofragmented), and the cyclic stress from internal blood pressure can be applied to the integrated tissue.

Applicant has conducted studies with the systems, methods, and devices of the present inventive concepts in sheep. Tested devices comprised a polymer matrix formed from electrospun ElastEon™ copolymer from Aortech Biomaterials, with fiber sizes of 7.8+/−1.7 micron and elastic tension modulus of 25.8+/−2.8 N/cm (calculated at an operational 5% strain level). Applicant has observed remodeling of graft device 100 occurs in three phases: acute (e.g. remodeling that occurs within one-month post-implantation), sub-chronic (e.g. remodeling that occurs between one and six months post-implantation), and chronic (e.g. remodeling that occurs after six months post-implantation).

Figure 4:
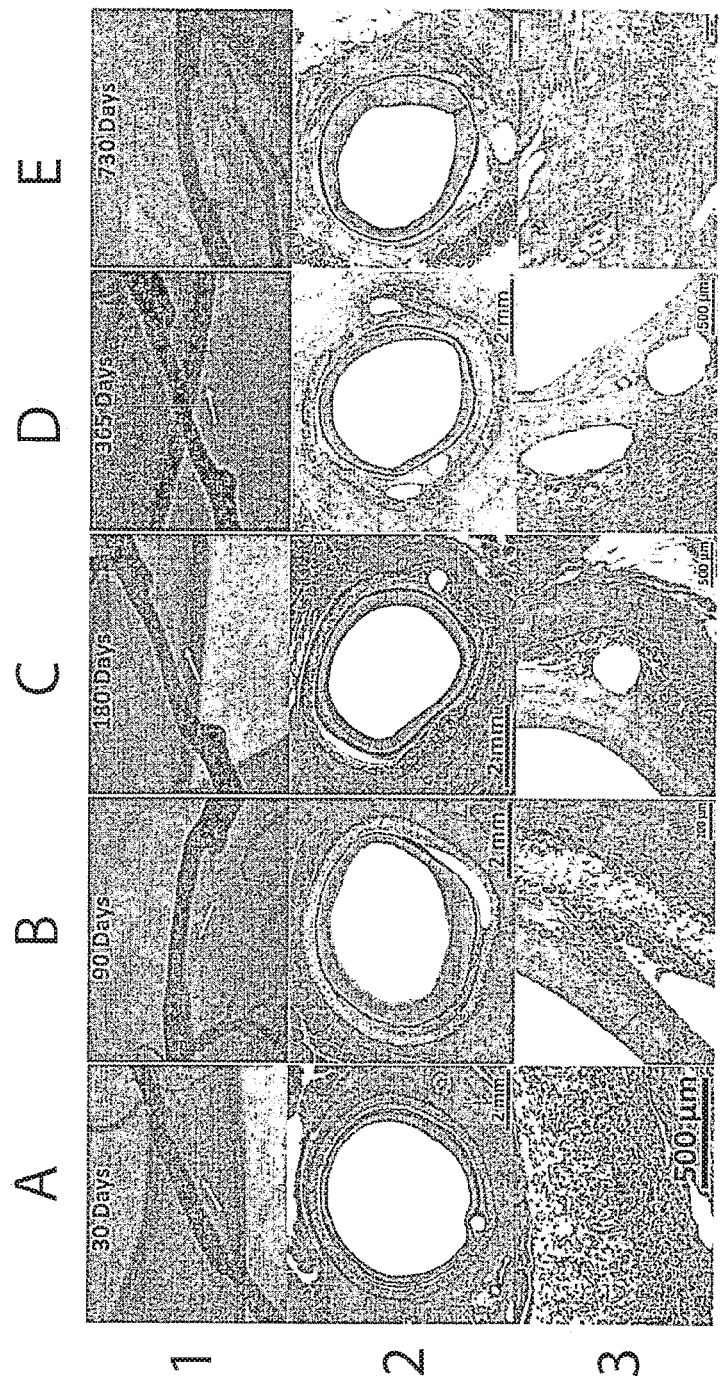
FIGS. 4-9 illustrate data from studies conducted by applicant to support the development of a graft device, consistent with the present inventive concepts.

Referring now to FIG. 4, applicant collected data demonstrating that between three and six months post-implantation of graft device 100, integrated tissue demonstrates sufficient strength, such as to resist subsequent dilation. As shown, column A (30 days post-implantation) represents data collected during the acute remodeling phase, columns B (90 days post-implantation) and C (180 days post-implantation) represent data collected during the subchronic remodeling phase, and columns D (365 days post-implantation) and E (730 days post-implantation) represent data collected during the chronic remodeling phase. Additionally, row 1 comprises a set of representative snapshots obtained from angiographic imaging over time using a chronic sheep femoral bypass implant model; row 2 comprises low magnification images of Movat's pentachrome stained sections from the mid graft location of grafts harvested from the sheep implant model over time; and row 3 comprises high magnification images of hematoxylin and eosin stained sections from the mid graft location of grafts harvested from the sheep implant model over time.

As observed by the applicant during the acute remodeling phase, distension and/or subsequent plastic dilation of the graft device under arterial pressure is prevented or otherwise limited, thereby maintaining higher velocity and undisrupted blood-flow. Pseudointima formation was observed on the graft device lumen's interior surface. Macrophages and fibroblasts were observed to penetrate the graft material. As observed by the applicant during the subchronic remodeling phase, the graft material exhibited a progressive mechanical fragmentation as it became embedded within a continuum of highly vascularized fibrous tissue. As the polymer material became biofragmented, the structural support was transferred to the developing tissue. Neointima stabilization and new endothelium formation was observed on the lumen's interior surface. During the later stages of the subchronic phase, the elastic fibers organized and condensed into structures that resembled an arterial-like external elastic lamina (EEL) and internal elastic lamina (IEL) that subtended the neo-medial layer of the remodeled graft device. As observed by the applicant during the chronic remodeling phase, the lumen's interior surface exhibited neointima maturation and new elastic laminae formation. Additionally, pulsatile stress was exerted on the graft device. After 365 days post-implantation, applicant further observed lumen stabilization and tissue maturation.

Figure 5:
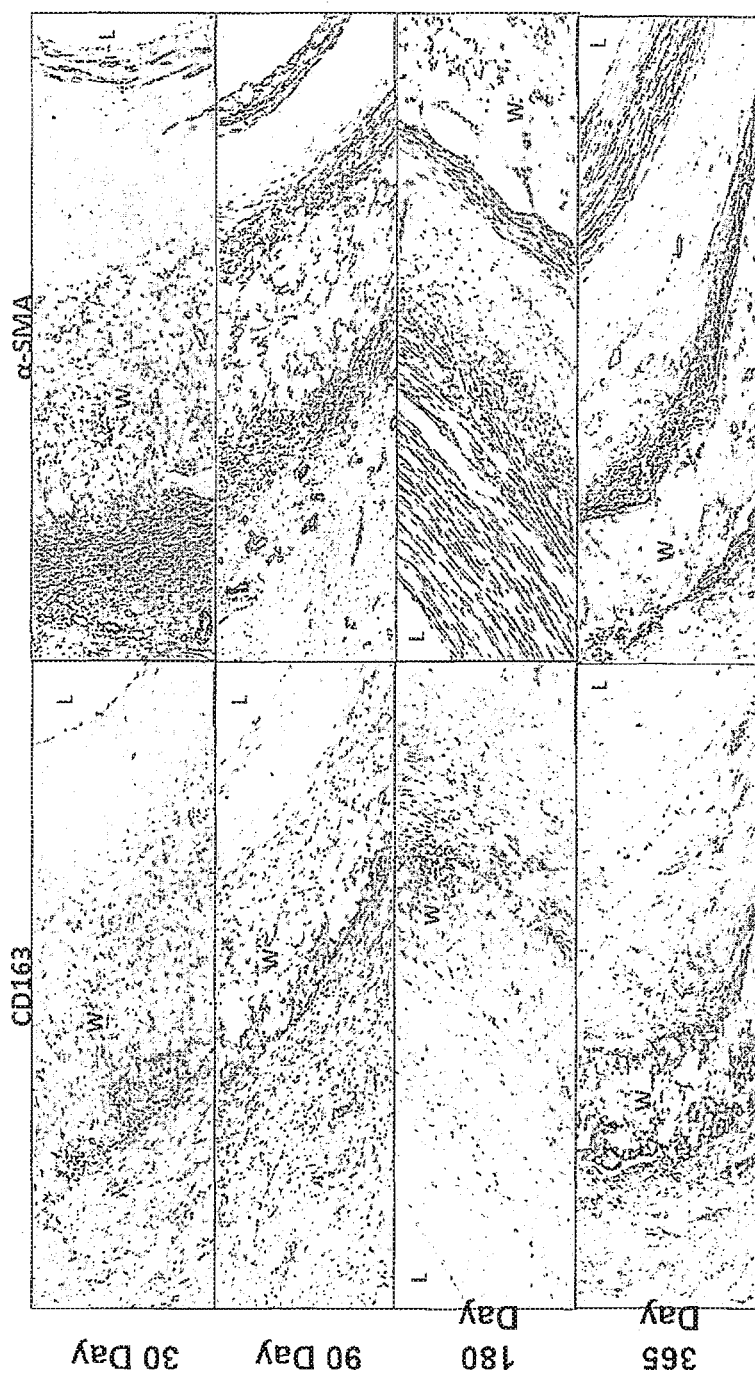

Referring now to FIG. 5, applicant collected data demonstrating the neo-media becomes populated with smooth muscle cells and myofibroblasts during the later stages of the subchronic remodeling phase, as evidenced by the expression of alpha-smooth muscle actin (α-SMA). Additionally, the endothelium reached confluence in the graft device by 90 days. For reference, applicant has included a "W" to indicate a portion of the graft device and an "L" to indicate a portion of the graft device lumen. There was limited inflammation associated with the graft at all timepoints. Inflammation was characterized as a local minimal to mild foreign body reaction mediated by macrophages and foreign body giant cells along the material. This was confirmed via immunohistochemical staining with CD163, which showed the presence and localization of macrophages over time.

Figure 6:
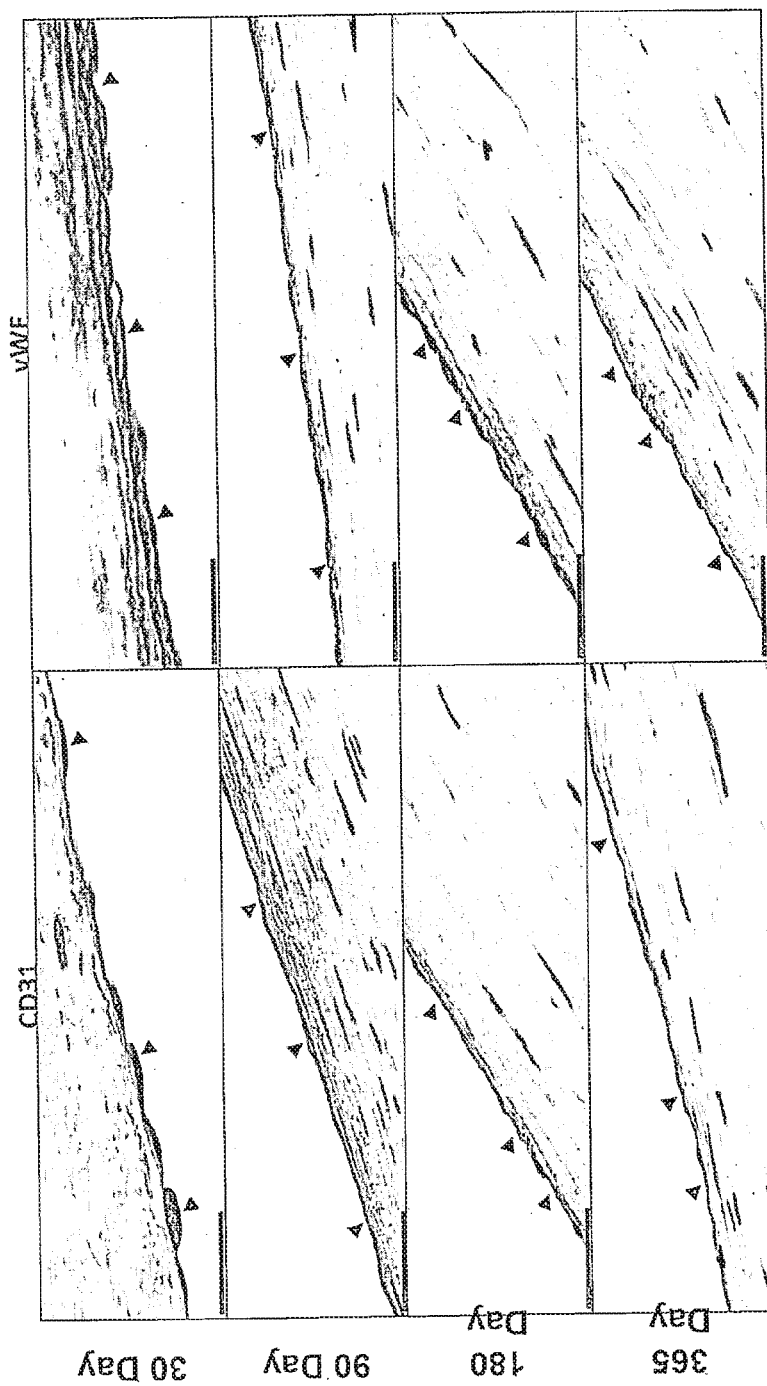

Referring now to FIG. 6, applicant collected data demonstrating immunohistochemical staining with CD31 and von Willebrand factor (vWF) confirming that the cells lining the lumen of treated SVGs from all cohorts comprise endothelial cells. During the chronic remodeling phase, the polymer material continued to be biofragmented and embedded within progressively organized fibromuscular tissue. This remodeled tissue continued to mature and become quiescent, integrating the device into the continuum of tissue that was ultimately responsible for preventing dilation under arterial pressure. Additionally, the EEL, IEL, and neo-media continued to mature and stabilize, thereby giving the remodeled graft the appearance of a stable conduit with arterial-like features.

Figure 7:
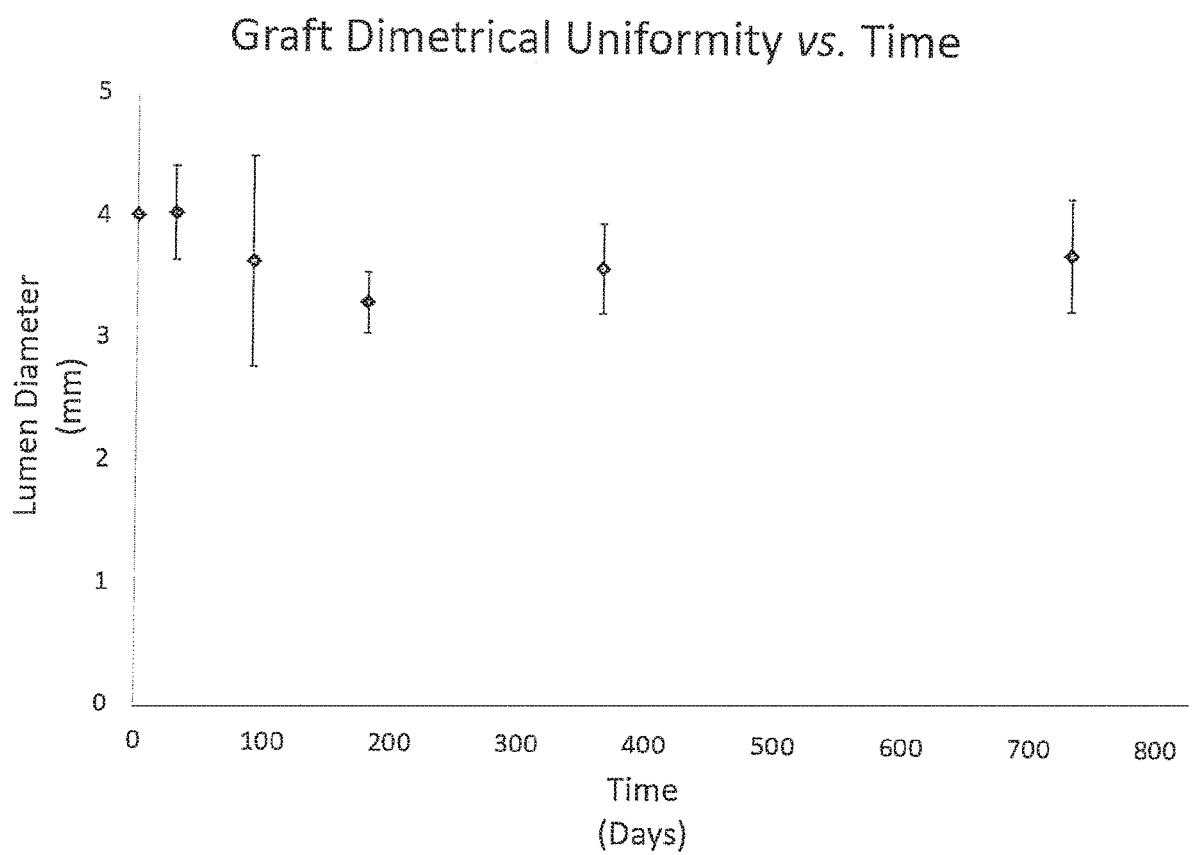

Referring now to FIG. 7, applicant collected data to quantify the graft device's geometric stability as identified with angiography imaging. In some embodiments, the graft device comprises a geometric stability baseline (e.g. an initial inner and/or outer diameter that is present prior to remodeling that occurs after implantation in the patient) of approximately 4.0 mm, 4.5 mm, 5.0 mm, 5.5 mm, 6.0 mm, 6.5 mm, 7.0 mm, 7.5 mm, or 8.0 mm. Here, applicant observed the graft comprised a geometric stability baseline of approximately 4.0 mm. At 30 days, the graft comprised a geometric stability (e.g. remodeled diameter) of 4.02±0.38 mm. At 90 days, the graft comprised a geometric stability of 3.63±0.86 mm. At 180 days, the graft comprised a geometric stability of 3.3±0.25 mm. At 365 days, the graft comprised a geometric stability of 3.59±0.37 mm. At 730 days, the graft comprised a geometric stability of 3.74±0.46 mm.

Figure 8:
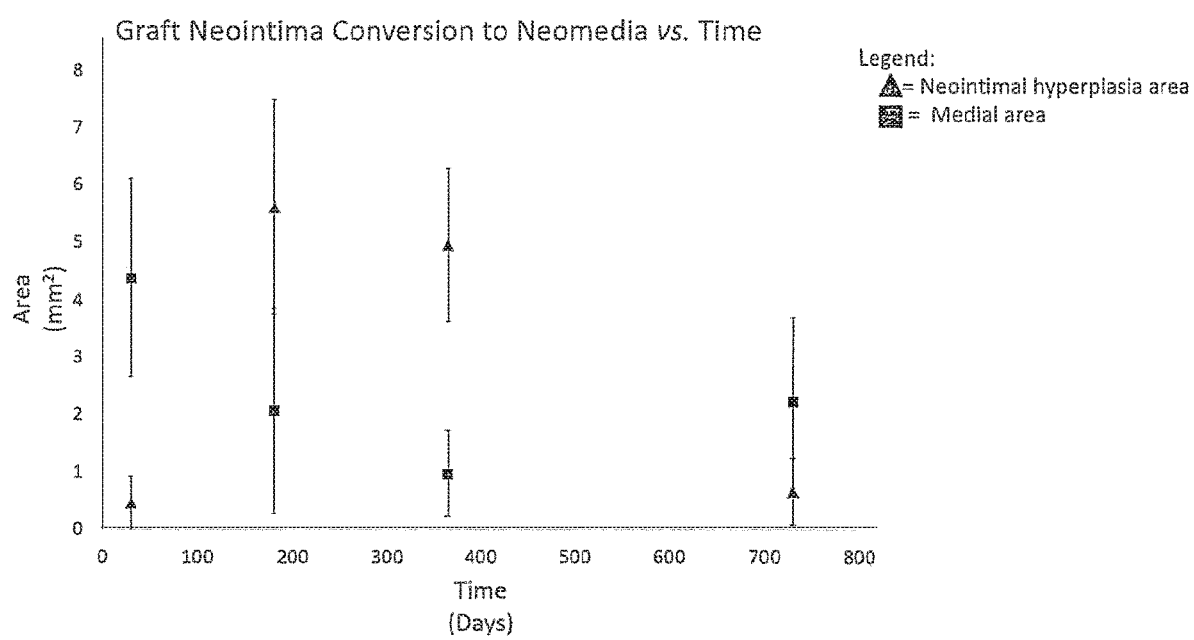

Referring now to FIG. 8, applicant collected data to quantify the graft device's histomorphometry. Applicant observed neointimal hyperplasia (IH) can be controlled in order to prevent progressive luminal narrowing. The overall remodeling response of the graft involves a conversion of the fibrous connective tissue capsule to an adventitia. Conversion of the fibrous connective tissue capsule to an adventitia can be achieved by: buttressing against dilation under arterial pressure; preventing uncontrolled IH; and shifting the tunics so that over time the graft develops a media by remodeling the neointima.

Figure 9:

Referring now to FIG. 9, applicant collected data demonstrating stable neo-media developed between an EEL and IEL. Additionally, the neo-media is populated with smooth muscle cells and is lined with endothelial cells. Applicant observed this process to be predictable and reproducible.

The tissue in which graft device 100 becomes integrated can provide a seal to prevent blood leakage. In some embodiments, graft device 100 can comprise a seal configured to temporarily prevent blood leakage during implantation and/or until sufficient host tissue ingrowth has occurred. For example, graft device 100 can comprise a resorbable hydrogel sealant composed of a commercially available USP grade gelatin, which is partially crosslinked with glutaraldehyde, and is intended to resorb within two-three months after implantation.

Applicant has observed graft device 100 inner surface is coated with one or more proteins adsorbed from circulating blood, and a thin fibrin clot begins to form a pseudointima. Concurrently, macrophages and multi-nucleated giant cells accumulate on both the fiber matrix inside and outside surfaces, and these cells can begin to enzymatically degrade/hydrolyze the resorbable hydrogel sealant. Within a few weeks, there is a substantial infiltration of cells (e.g. macrophages, fibroblasts, myofibroblasts, etc.) within the fiber matrix and pores 104. Also during this time, the pseudointima is populated by fibroblasts and myofibroblasts and remodels into a neointima. By about six weeks to ten weeks following implantation, the fiber matrix and pores 104 are fully infiltrated with cells and the sealant has been substantially resorbed. These cells begin to recruit their own circulatory support and small blood vessels form around the fiber matrix and within pores 104. Over time, the cells proliferate and synthesize the extracellular matrix, exerting a stress on the fiber matrix. In addition, the fibers become embrittled through oxidation from exposure to the biologic environment, and the fibers begin to crack. The progression of these cracks results in biofragmentation of the fiber matrix. As this occurs, the tissue within, and around, the fiber matrix becomes exposed to the pulsatile stress exerted by circulating blood. The tissue within, and around, the implant becomes sufficiently thick and mature, so as to resist dilation. Tissue begins to remodel in response to the pulsatile stress and result in artery-like features. As the micro-vessels developing within pores 104 reach further toward the neointima, new endothelial cells are delivered toward and spread along the inner surface.

Referring now to FIG. 1B, a side, sectional view of a graft device including a tapered profile is illustrated, consistent with the present inventive concepts. Graft device 100 can comprise an inner diameter ID that tapers along the length of graft device 100. For example, first portion 101 can comprise an inner diameter $ID_1$ that is greater than an inner diameter $ID_2$ of second portion 102. Graft device 100 can comprise a taper angle $A_1$ that can be dependent on the length of graft device 100, such that there will be a comparable match at the proximal and distal ends of graft device 100 (e.g. to insure there is neither an abrupt decrease in the cross-sectional area of lumen 103, nor a substantial dead space in the flow path). In some embodiments, taper angle $A_1$ is approximately equal to arctan (0.45D/L), where D is the largest inner diameter of graft device 100 and L is the length of graft device 100. In some embodiments, taper angle A1 comprises an angle of at least 1°, such as an angle of at least 3°, or such as an angle of at least 5°. Graft device 100 of FIG. 1B comprises a single layer as shown. In some embodiments, graft device 100 of FIG. 1B can comprise multiple layers, such as an inner layer 105 and an outer layer 110 described hereabove in reference to FIGS. 1 and 1A.

Figure 2:
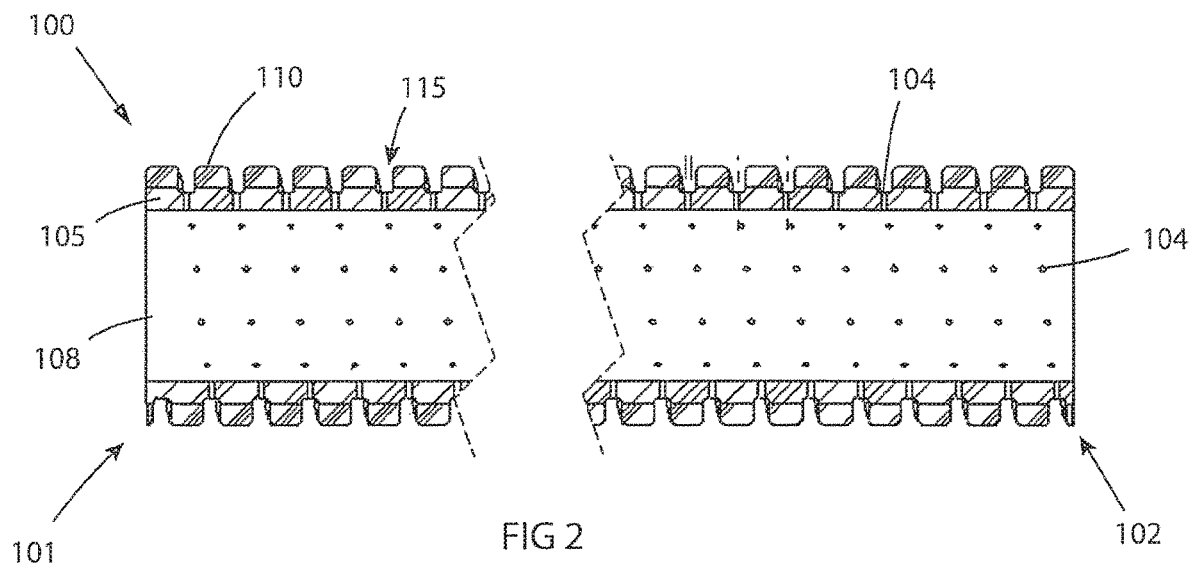
FIG. 2 illustrates a side, sectional view of a graft device, consistent with the present inventive concepts.

Referring now to FIG. 2, a side, sectional view of a graft device is illustrated, consistent with the present inventive concepts. Graft device 100 of FIG. 2 includes inner layer 105 and surrounding outer layer 110, with helical groove 115 extending through outer layer 110 as shown. Graft device 100 of FIG. 2 can include one or more components of similar construction and arrangement to corresponding components of graft device 100 of FIG. 1 described hereabove, such as pores 104.

Graft device 100 can comprise one or more coatings, coating 108, which is shown positioned on the inner surface of inner layer 105. Coating 108 can comprise an anti-thrombogenic (i.e. thromboresistant) coating. Coating 108 can comprise an adhesive coating or otherwise exhibit adhesive properties, such as a coating comprising a material selected from the group consisting of: fibrin; fibrin gel; a starch-based compound; mussel adhesive protein; and combinations of these. Coating 108 can comprise a dehydrated gelatin, such as a dehydrated gelatin coating configured to hydrate one or more portions of device 100, such as to cause adherence of two or more of inner layer 105 and/or outer layer 110. Coating 108 can comprise a hydrophilic and/or a hydrophobic coating. Coating 108 can comprise a visualizable coating, such as a radiopaque coating and/or an ultrasonically reflective coating. In some embodiments, coating 108, inner layer 105, and/or outer layer 110 can comprise a material configured to elute a drug or other agent, such as an agent configured to prevent thrombus formation. In some embodiments, coating 108 comprises heparin. In some embodiments, coating 108 is constructed and arranged to provide one, two, or more functions selected from the group consisting of: anti-thrombogenicity; anti-proliferation; anti-calcification; vasorelaxation; adhesion; hydration; visualization; water resistance; water affinity; and combinations of one or more of these. In some embodiments, coating 108 is positioned on one or more surfaces of one or more layers of graft device 100 (e.g. inner and/or outer surface of inner layer 105 and/or a surface of any layer of outer layer 110). Coating 108 can comprise a coating constructed and arranged to elute slowly (e.g. a slow release of the material of the coating), such as to elute at a slower rate than the bioresorption, biodegradation, bioerosion, and/or biofragmentation rate of the material onto which coating 108 is applied.

Coating 108 can be applied manually or with one or more devices, such as are described herebelow in reference to system 10 of FIG. 3. In some embodiments, coating 108 is applied with a device selected from the group consisting of: electrospinning device; melt-spinning device; melt-electrospinning device; 3D printer; fused deposition modeling device; sprayer; weaver; braider; knitter; dipping machine; casting machine; and combinations of these.

In some embodiments, coating 108 comprises tissue, such as tissue harvested from an artery or vein via a surgical instrument such as a cylindrical endothelium-tome. In these embodiments, coating 108 can comprise a thickness of 20 microns to 50 microns and it can include cells from an endothelial layer.

Figure 2A:
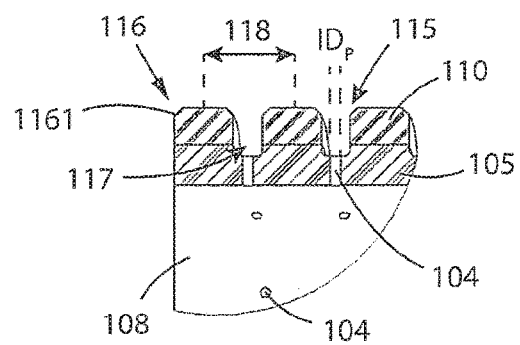
FIG. 2A illustrates a close-up, side sectional view of the graft device of FIG. 2, consistent with the present inventive concepts.

Referring additionally to FIG. 2A, a close-up, side sectional view of a portion of the graft device of FIG. 2 is illustrated, consistent with the present inventive concepts. Graft device 100 can comprise a thickness $T_D$, inner layer 105 can comprise a thickness $T_{IL}$, and outer layer 110 can comprise a thickness $T_{OL}$ as described hereabove in reference to FIG. 1A. Outer layer 110 can comprise a groove 115 oriented in a spiral or otherwise helical geometry that includes alternating peaks 116 and valleys 117, with a pitch 118 comprising the distance between adjacent peaks 116 (or adjacent valleys 117). In some embodiments, peaks 116 comprise one or more chamfered edges as shown (e.g. one or more edges of peaks 116 are cut-away to create a symmetrical sloping edge). In some embodiments, the intersection of peaks 116 and valleys 117 comprise one or more chamfered, or otherwise rounded, edges 1161 shown (e.g. one or more top edges of valleys 117 are cut-away, such as to create a symmetrical sloping edge).

In some embodiments, valleys 117 further comprise a portion of inner layer 105 (e.g. valleys 117 extend into a portion of inner layer 105). In some embodiments, pores 104 are positioned to extend from the bottom of valleys 117 through inner layer 105. Pores 104 can comprise an inner diameter $ID_P$, as described hereabove in reference to FIG. 1.

Referring now to FIG. 3, a schematic view of an example system for producing a graft device with one or more layers is illustrated, consistent with the present inventive concepts. System 10 includes a fiber matrix delivery assembly, electrospinning device 400. System 10 is constructed and arranged to produce one or more graft devices 100 including outer layer 110 surrounding inner layer 105.

System 10 includes mandrel 250 about which inner layer 105 can be applied (inner layer 105 shown already delivered about mandrel 250 in FIG. 3). Mandrel 250 can comprise a straight, tapered, or a curved mandrel. Mandrel 250 can be radially compressible (e.g. shrinkable) or dissolvable, such as to be removed after creation of inner layer 105 and/or outer layer 110. Mandrel 250 can be constructed and arranged to change phase prior to removal from inner layer 105 (e.g. the material could be freeze dried, sublimated and/or melted at a low temperature to assist in the removal from inner layer 105). In some embodiments, mandrel 250 is a fluid mandrel, such as the fluid mandrel described in applicant's U.S. Pat. No. 9,656,417 issued on May 23, 2017, which is incorporated herein by reference in its entirety. Mandrel 250 can comprise two parts, such as a two piece construction comprising a stainless steel core and a surrounding static dissipating plastic (e.g. polyurethane) shell. Mandrel 250 can comprise a metal mandrel, such as a mandrel constructed of 304 or 316 series stainless steel. Mandrel 250 can comprise a mirror-like surface finish, such as a surface finish with an Ra ranging from approximately 0.1 µm to 0.8 µm. Mandrel 250 can comprise a length of up to 80 cm, or 95 cm, such as a length ranging from 70 cm to 80 cm.

Inner layer 105 can comprise a softer durometer material configured to improve graft compliance matching to an artery. In some embodiments, inner layer 105 comprises ElastEon 90A. In some embodiments, inner layer 105 comprises ElastEon 82A. In some embodiments, inner layer 105 comprises ElastEon 77A. In some embodiments, outer layer 110 comprises ElastEon 90A. In some embodiments, outer layer 110 comprises ElastEon 55D.

Inner layer 105 can be formed by dispensing a polymer solution through nozzle 427 at flow rates ranging from 5 ml/hr to 40 ml/hr, such as at a flow rate between 10 ml/hr and 15 ml/hr. Inner layer 105 can comprise a thickness ranging from 350 µm to 500 µm. Outer layer 110 can be formed by subsequently dispensing a polymer solution through nozzle 427 at flow rates ranging from 5 ml/hr to 40 ml/hr, such as at a flow rate between 10 ml/hr and 15 ml/hr. Outer layer 110 can comprise a thickness ranging from 500 µm to 800 µm. Outer layer 110 can comprise a porosity ranging from 40% to 80%, such as an outer layer 110 with an average porosity of 50.4% or 46.9%. Outer layer 110 and/or inner layer 105 can comprise a matrix of fibers with a diameter ranging from 1 µm to 20 µm, such as a matrix of fibers with an average diameter of approximately 5 µm, or approximately 10 µm. In some embodiments, inner layer 105 and/or outer layer 110 comprise fibers with a diameter of at least 5 µm.

In some embodiments, system 10 is constructed and arranged to perform a surface modification configured to enhance the adhesion of inner layer 105 and outer layer 110. In some embodiments, system 10 is constructed and arranged to perform a surface modification to inner layer 105 and/or outer layer 110 to cause a modification of the surface energy of one or more surfaces of inner layer 105 and/or outer layer 110, respectively. Surface modifications can include, but are not limited to: plasma ionization; treatment with a surfactant; treatment with a lipid; and combinations of these.

Modification assembly 605 is operably attached to a supply, supply 620, via conduit 625. Conduit 625 can comprise a tube (e.g. a fluid delivery tube), one or more conductors (e.g. one or more wires), one or more optical fibers, and combinations of these. Supply 620 can comprise one or more of: a reservoir of one or more agents such as agent 502; a power supply such as a laser power supply; a source of light energy such as a laser; a source of sound energy such as a source of ultrasound energy; and a reservoir of compressed fluid. In some embodiments, modifying element 627 comprises a nozzle, such as a nozzle configured to deliver an outer layer 110 modifying agent, inner layer 105 modifying agent, and/or a graft device 100 modifying agent.

In some embodiments, modifying element 627 includes a component configured to deliver an agent 502 comprising a wax or other protective substance to inner layer 105 and/or outer layer 110, prior to the application of subsequent layers (e.g. to inner layer 105 and/or outer layer 110), such as to prevent or otherwise minimize exposure of the already applied layers to one or more solvents included in polymer material 111.

In some embodiments, modifying element 627 is configured to modify inner layer 105 and/or outer layer 110, such as to enhance the performance of the graft device 100 produced by system 10. In these graft device 100 modifying embodiments, modifying element 627 can comprise a component selected from the group consisting of: a robotic device such as a robotic device configured to create groove 115; a robotic device configured to create pore 104; a robotic device to locate the edge of groove 115 or an end of graft device 100; a nozzle, such as a nozzle configured to deliver agent 502; an energy delivery element such as a laser delivery element such as a laser excimer diode or other element configured to create groove 115 and/or pore 104 and/or trim one or more components of graft device 100; a fluid jet such as a liquid jet (e.g. water jet) or gas jet (e.g. air jet) configured to deliver fluid during the creation of device 100; a cutting element such as a cutting element configured to create groove 115, pore 104 and/or to trim inner layer 105 and/or outer layer 110; a mechanical abrader (e.g. an abrader configured to create groove 115); an element configured to deliver sound energy such as ultrasound energy; a three-dimensional printer to create groove 115; a braiding device; a knitting device; a weaving device; and combinations of these. Modification of inner layer 105, outer layer 110, and/or other component of graft device 100 by modifying element 627 can occur during the application of inner layer 105, after the application of inner layer 105 (e.g. but before application of outer layer 110), during the application of outer layer 110, and/or after outer layer 110 has been applied. In some embodiments, modifying element 627 can be used to create groove 115 and/or pores 104, and/or to cut or otherwise trim inner layer 105 and/or outer layer 110 (e.g. to trim an end of graft device 100).

Figure 3A:
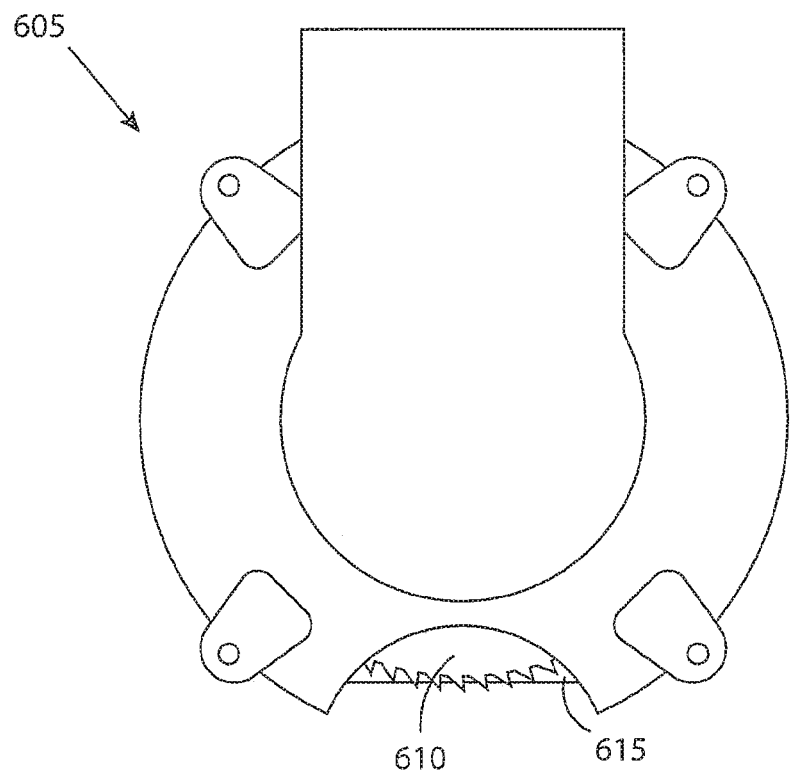
FIGS. 3A and B illustrate a side view of a modification assembly and an end view of a saw blade, respectively, consistent with the present inventive concepts.
Figure 3B:
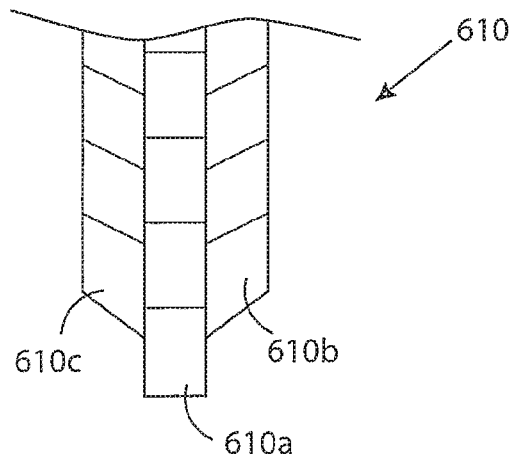
FIG. 3C illustrates a close-up view of a modification assembly removing a portion of a graft device, consistent with the present inventive concepts.

In some embodiments, modification assembly 605 of system 10 can be an additional component, separate from electrospinning device 400, such as a bench-mounted and/or handheld device configured to create groove 115, pores 104 and/or to cut or otherwise trim outer layer 110 and/or inner layer 105. In some embodiments, modification assembly 605 comprises a laser, such as a bench-mounted or hand operated laser device. In some embodiments, modification assembly 605 comprises a saw, such as a bench-mounted saw device, such as is shown in FIGS. 3A and 3B. In some embodiments, modification assembly 605 comprises a metal pin, such as a bench-mounted device. Modification assembly 605 can be used to modify graft device 100 after removal from electrospinning device 400, such as prior to and/or during an implantation procedure.

Laser or other modifications to outer layer 110 and/or inner layer 105 can cause portions of outer layer 110 and/or inner layer 105 to undergo physical changes, such as hardening, softening, melting, stiffening, creating a resilient bias, expanding, and/or contracting, and/or can also cause outer layer 110 and/or inner layer 105 to undergo chemical changes such as cross-linking, oxidation, hydrolysis, and/or degradation.

Nozzle 427 can be constructed of stainless steel, such as passivated 304 stainless steel. A volume of space surrounding nozzle 427 can be maintained free of objects or substances which can interfere with the electrospinning process, such as is described in applicant's co-pending U.S. patent application Ser. No. 15/036,304, filed Nov. 12, 2012, the contents of which is incorporated herein by reference in its entirety. Nozzle geometry and orientation, as well as the electrical potential voltages applied between nozzle 427 and mandrel 250 are chosen to control fiber generation.

Mandrel 250 can be positioned in a particular spaced relationship from polymer delivery assembly 405 and/or modification assembly 605, and nozzle 427 and/or modifying element 627, respectively. As illustrated, in some embodiments, mandrel 250 is positioned above and below assemblies 605 and 405, respectively. Alternatively, mandrel 250 can be positioned either above, below, to the right and/or to the left of, assembly 405 and/or assembly 605. The distance between mandrel 250 and the tip of nozzle 427 and/or modifying element 627 can be no more than 20 cm, such as no more than 15 cm. In some embodiments, the distance between mandrel 250 and the tip of nozzle 427 and/or modifying element 627 comprises a distance of between 12.2 cm and 12.8 cm, such as approximately 12.5 cm. In some embodiments, multiple nozzles 427 and/or multiple modifying elements 627, for example components of similar or dissimilar configurations, can be positioned in various orientations relative to mandrel 250. In some embodiments, the distance between nozzles 427 and/or modifying elements 627 and mandrel 250 varies along the length of their respective travel along mandrel 250, such as to create a varying pattern of application of inner layer 105 and/or outer layer 110. In some embodiments, the distance of nozzle 427 (and/or modifying element 627) from mandrel 250 can vary continuously during the electrospinning process and/or the distance can vary for one or more set periods of time during the process (e.g. a variation at one or more particular locations along graft device 100).

In some embodiments, an electrical potential is applied between nozzle 427 and one or more of: mandrel 250, inner layer 105, and/or outer layer 110. For purposes of clarity, the electrical potential applied to mandrel 250, inner layer 105, outer layer 110, and/or any portion of graft device 100 shall be referred to herein as the electrical potential applied to mandrel 250. The electrical potential can draw at least one fiber (an electrospun fiber) from polymer delivery assembly 405 toward mandrel 250 (e.g. toward partially formed inner layer 105 and/or outer layer 110). Inner layer 105 and/or outer layer 110 can act as the substrate for this electrospinning process, collecting the fibers that are drawn from polymer delivery assembly 405 by the electrical potential. In some embodiments, mandrel 250 has a lower voltage applied than nozzle 427, to create the desired electrical potential. For example, the voltage applied to mandrel 250 can be a negative or zero voltage while the voltage of nozzle 427 can be a positive voltage. Mandrel 250 can have an applied voltage ranging between −10 kV to −1 kV (e.g. −10 kV, −9 kV, −8 kV, −7 kV, −6 kV, −5 kV, −4.5 kV, −4 kV, −3.5 kV, −3.0 kV, −2.5 kV, −2 kV, −1.5 kV, or −1 kV). Nozzle 427 can have an applied voltage ranging between +2 kV to +20 kV (e.g., +2.5 kV, +5 kV, +7.5 kV, +12 kV, +13.5 kV, +15 kV, +17 kV, or +20 kV). In some embodiments, the potential difference between nozzle 427 and mandrel 250 can range from +5 kV to +30 kV. This potential difference draws fibers from nozzle 427 to mandrel 250, inner layer 105, and/or outer layer 110. In some embodiments, nozzle 427 is electrically charged with a potential ranging from +15 kV to +17 kV while mandrel 250 is at a potential of approximately −2 kV.

Polymer material 111 (e.g. polymer material 111a and/or 111b) can be introduced into polymer solution dispenser 401, and then delivered to polymer delivery assembly 405 through polymer solution delivery tube 425. In some embodiments, polymer solution dispenser 401 comprises polymer solution dispenser 401a in which polymer material 111a is introduced, and polymer solution dispenser 401b in which polymer material 111b is introduced. The electrical potential between positively charged nozzle 427 and negatively charged inner layer 105, outer layer 110, and/or mandrel 250 can draw the polymer solution through nozzle 427 of polymer delivery assembly 405. Electrostatic repulsion, caused by the fluid becoming charged from the electrical potential, counteracts the surface tension of a stream of the polymer solution at nozzle 427 of the polymer delivery assembly 405. After the stream of polymer solution is stretched to its critical point, one or more streams of polymer solution emerges from nozzle 427 of polymer delivery assembly 405, and/or at a location below polymer delivery assembly 405, and the one or more streams move toward the negatively charged mandrel 250. Using a volatile solvent, the solution dries substantially during transit and fiber is applied about mandrel 250 (e.g. fibers to create inner layer 105 and/or outer layer 110).

Mandrel 250 can be configured to rotate about an axis, such as central axis 435 of mandrel 250, with axis 428 of nozzle 427 typically oriented orthogonal to axis 435. In some embodiments, axis 428 of nozzle 427 is horizontally offset from axis 435. The rotation around axis 435 allows inner layer 105 and/or outer layer 110 to be applied along all sides, or around the entire circumference of mandrel 250 and/or one or more already applied layers of fiber. In some embodiments, two motors 440a and 440b are used to rotate mandrel 250. Alternatively, electrospinning device 400 can include a single motor configured to rotate mandrel 250 as described hereabove. The rate of rotation of mandrel 250 can determine how the electrospun fibers are applied. For example, for a thicker portion of inner layer 105 and/or outer layer 110, the rotation rate can be slower than when a thinner portion of inner layer 105 and/or outer layer 110, respectively, is desired. In some embodiments, mandrel 250 is rotated at a rate ranging from 100 rpm to 400 rpm, such as a rate of between 200 rpm and 300 rpm, between 240 rpm and 260 rpm, or approximately 250 rpm.

In addition to mandrel 250 rotating around axis 435, the polymer delivery assembly 405 can move, such as when driven by drive assembly 445 in a reciprocating or oscillating horizontal motion (to the left and right of the page), over the travel distance $D_{SWEEP}$ shown. Drive assembly 445, as well as drive assembly 645 which operably attaches to modification assembly 605, can each comprise a linear drive assembly, such as a belt-driven drive assembly comprising two or more pulleys driven by one or more stepper motors. Additionally or alternatively, assemblies 405 and/or 605 can be constructed and arranged to rotate around axis 435 (rotating means not shown). The length of drive assemblies 445 and/or 645 and the linear motion applied to assemblies 405 and 605, respectively, can vary based on the length of inner layer 105 to which an outer layer 110 is delivered and/or an outer layer 110 modification is applied. For example, the supported linear motion of drive assemblies 445 ($D_{SWEEP}$ shown) and/or 645 can range from 10 cm to 95 cm. Rotational speeds of mandrel 250 and translational speeds of assemblies 405 and/or 605 can be relatively constant or can be varied during the fiber application process. In some embodiments, assembly 405 and/or 605 are translated (e.g. back and forth) at a relatively constant translation rate ranging from 40 mm/sec to 200 mm/sec, such as approximately 65 mm/sec, during the majority of its travel. In some embodiments, system 10 is constructed and arranged to rapidly change directions of translation (i.e. maximize deceleration before a direction change and/or maximize acceleration after a direction change).

Assemblies 405 and/or 605 can move along the entire length or specific portions of the length of an already applied layer of fibers (e.g. an already applied layer of inner layer 105 and/or outer layer 110). In some embodiments, fiber and/or modification is applied to the entire intended length of graft device 100 plus an additional 5 cm (to mandrel 250) on either or both ends of inner layer 105 and/or outer layer 110. In some embodiments, fiber(s) and/or modification is applied to the entire intended length of graft device 100 plus at least 1cm beyond either or both ends of graft device 100. Assemblies 405 and/or 605 can be controlled such that specific portions along the length of graft device 100 are reinforced with a greater amount of inner layer 105 and/or outer layer 110, as compared to other or remaining portions. In addition, mandrel 250 can be rotated around axis 435 while assemblies 405 and/or 605 move, via drive assemblies 445 and/or 645, respectively, to position assemblies 405 and/or 605 at the particular portion of mandrel 250 to which fiber is to be applied and/or modified.

System 10 can also include a power supply, power supply 410 configured to provide the electric potentials to nozzle 427 and mandrel 250, as well as to supply power to other components of system 10 such as drive assemblies 445 and 645 and modification assembly 605. Power supply 410 can be connected, either directly or indirectly, to at least one of mandrel 250, inner layer 105, and/or outer layer 110. Power can be transferred from power supply 410 to each component by, for example, one or more wires.

System 10 can include an environmental control assembly including environmental chamber 20 that surrounds electrospinning device 400. System 10 can be constructed and arranged to control the environmental conditions within chamber 20, such as to control one or more environment surrounding polymer delivery assembly 405 and/or mandrel 250 during the application of inner layer 105 and/or outer layer 110. Chamber 20 can include inlet port assembly 21 and outlet port assembly 22. Inlet port assembly 21 and/or outlet port assembly 22 can each include one or more components such as one or more components selected from the group consisting of: a fan; a source of a gas such as a dry compressed air source and/or an inert gas; a source of gas at a negative pressure; a vapor source such as a source including a buffered vapor, an alkaline vapor and/or an acidic vapor; a filter such as a HEPA filter; a dehumidifier; a humidifier; a heater; a chiller; an electrostatic discharge reducing ion generator; and combinations of these. Chamber 20 can include one or more environmental control components to monitor and/or control temperature, humidity and/or pressure within chamber 20. Chamber 20 can be constructed and arranged to provide relatively uniform ventilation about mandrel 250 (e.g. about inner layer 105 and/or outer layer 110) including an ultra-dry (e.g. ≤2 ppm water or other liquid content) compressed gas (e.g. air) source to reduce humidity. Inlet port 21 and outlet port 22 can be oriented to purge air from the top of chamber 20 to the bottom of chamber 20 (e.g. to remove vapors of one or more solvents (e.g. HFIP) which can tend to settle at the bottom of chamber 20). Chamber 20 can be constructed and arranged to replace the internal volume of chamber 20 at least once every 3 minutes, or once every 1 minute, or once every 30 seconds. Outlet port 22 can include one or more filters (e.g. replaceable cartridge filters) which are suitable for retaining halogenated solvents or other undesired materials evacuated from chamber 20. Chamber 20 can be constructed and arranged to maintain a flow rate through chamber 20 of at least 30 L/min, such as at least 45 L/min or at least 60 L/min during an initial purge procedure. Subsequent to the initial purge procedure, a flow rate of at least 5 L/min, at least 10 L/min, at least 20 L/min or at least 30 L/min can be maintained, such as to maintain a constant humidity level (e.g. a relative humidity between 20% and 24%). Chamber 20 can be further constructed and arranged to control temperature, such as to control temperature within chamber 20 to a temperature ranging from 15° C. and 25° C., such as between 16° C. and 20° C. with a relative humidity between 20% and 24%. In some embodiments, one or more objects or surfaces within chamber 20 are constructed of an electrically insulating material and/or do not include sharp edges or exposed electrical components. In some embodiments, one or more metal objects positioned within chamber 20 are electrically grounded.

In some embodiments, system 10 can include one or more tools 300 shown, such as a tool used to create groove 115 and/or pores 104, as described herein. In some embodiments, tool 300 comprises an ultraviolet light configured to photocure and/or photopolymerize the materials used to create graft device 100. In some embodiments, tool 300 comprises a plasma treatment device configured to change the surface properties of the materials used to create graft device 100. In some embodiments, tool 300 comprises an ion-beam generator configured to ion-etch, ion-mill, and/or ion sputter coat the materials used to create graft device 100. In some embodiments, system 10 includes a drying assembly 310 that can be used to remove solvents or other fluids from graft device 100.

In some embodiments, system 10 includes one or more components or assemblies, and/or otherwise is constructed and arranged, as described in applicant's co-pending U.S. patent application Ser. No. 15/036,304, filed Nov. 12, 2012, the contents of which is incorporated herein by reference in its entirety.

While system 10 of FIG. 3 describes an electrospinning device 400 for applying the fibers of inner layer 105 and outer layer 110, a different fiber delivering apparatus could be used. Also, while system 10 is shown as rotating mandrel 250 to cause circumferential application and modification of the fibers, in some embodiments, the fiber delivering and/or modifying elements (e.g. nozzle 427 and/or modifying element 627) can be rotated about mandrel 250 (e.g. with or without rotation of mandrel 250) to cause a similar circumferential application and/or modification of the fibers.

Referring additionally to FIGS. 3A and B, a side view of a modification assembly and an end view of a saw blade are illustrated, respectively, consistent with the present inventive concepts. Modification assembly 605 can comprise a saw including a blade 610 configured to create groove 115 of graft device 100 (e.g. by removing material from outer layer 110 and/or inner layer 105 of graft device 100). Modification assembly 605 can further include a depth block 615. The position of block 615 relative to blade 610 can be adjusted to control the depth at which blade 610 cuts into outer layer 110 and/or inner layer 105.

Blade 610 can comprise one or more blades, such as blades 610*a-c*. In some embodiments, blade 610 comprises a center blade 610*a* and two side blades 610*b,c* positioned one either side of center blade 610*a*. Side blades 610*b,c* can be configured as chamfer blades, as shown.

Figure 3C:
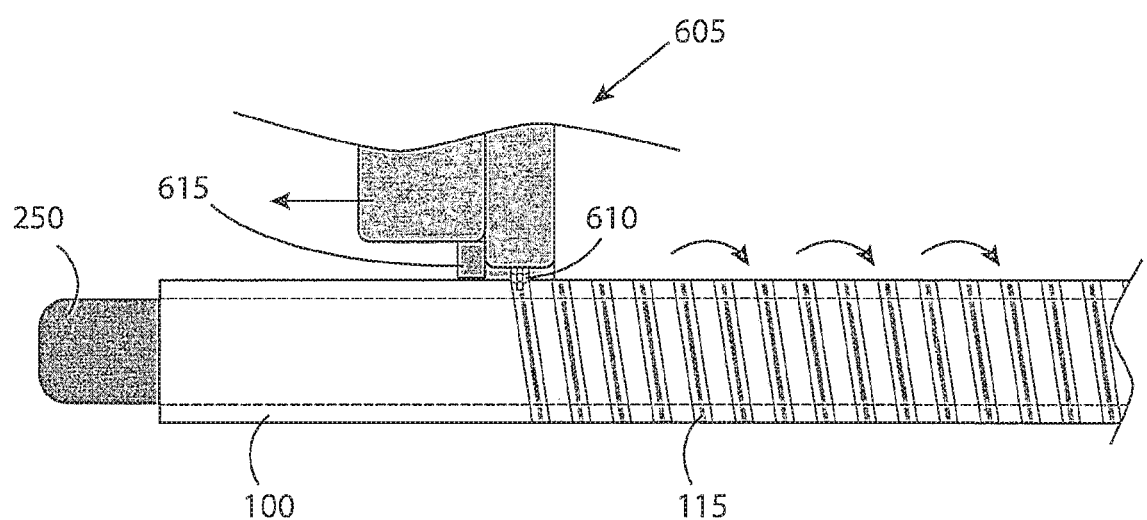

Referring additionally to FIG. 3C, a close-up view of a modification assembly removing a portion of a graft device is illustrated, consistent with the present inventive concepts. Modification assembly 605 can comprise blade 610, as described hereabove in reference to FIGS. 3A and 3B. Graft device 100 can be inserted over mandrel 250 and modification assembly 605 can be configured to translate along the length of mandrel 250. In some embodiments, as modification assembly 605 translates along mandrel 250, blades 601*a-c* create groove 115 along the length of graft device 100, as mandrel 250 is rotated. The translation and rotation directions of modification assembly 605 and mandrel 250, respectively, are indicated on FIG. 3C. Block 615 can abut the outer surface of graft device 100, limiting the depth of groove 115.

The above-described embodiments should be understood to serve only as illustrative examples; further embodiments are envisaged. Any feature described herein in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A graft device for a patient, the graft device comprising:
   an inner layer comprising a first porous arrangement of fibers defining a first tube comprising an inner wall and an outer wall;
   a first spiral pattern for strain-relief or kink-resistance over a length of the inner layer;
   an outer layer comprising a second porous arrangement of fibers defining a second tube comprising an inner wall and an outer wall, wherein the second tube surrounds the first tube, wherein the outer layer circumferentially surrounds the inner layer; and
   a plurality of macropores extending through at least the inner and the outer wall of the first tube,
   wherein at least one of the inner layer, the outer layer, or both are made of biofragmentable material configured to mechanically fracture into one or more fragments over time,
   wherein the first porous arrangement and the second porous arrangement are configured to promote endothelization by cellular ingrowth and tissue integration upon implantation of the graft device and over time to replace the mechanically fractured biofragmentable material,
   wherein the graft device comprises a 2% secant modulus between 2 MPa and 16 MPa, an inner diameter of the first tube ranging from 3 mm to 30 mm and a combined wall thickness between 0.3 mm and 2.5 mm,
   wherein the graft device as a result of a time-matched biofragmentation of the biofragmentable material and the cellular ingrowth and tissue integration comprises an over-time changing compliance range having a first compliance during a first period of time, wherein the first time period is defined as an initial state, and a second compliance during a second period of time, wherein the second period of time is defined as an over-time changing period of at least days after the implantation, and wherein the second compliance is greater than the first compliance, and wherein the first compliance comprises is no more than 1%/100 mmHg and the second compliance comprises at least 4%/100 mmHg.

2. The graft device as set forth in claim 1, wherein the macropores are configured to accelerate endothelization of the graft device.

3. The graft device as set forth in claim 1, wherein the inner layer and the outer layer each comprise a durometer configured to provide strength and/or kink resistance to the graft device.

4. The graft device as set forth in claim 1, wherein at least one component of the inner layer comprises a durometer that is lower than a durometer of at least one component of the outer layer.

5. The graft device as set forth in claim 1, wherein the inner layer comprises a thickness less than a thickness of the outer layer.

6. The graft device as set forth in claim 1, wherein the inner layer and the outer layer are electrospun layers.

7. The graft device as set forth in claim 1, wherein the mechanical fracture occurs six to twelve months upon the implantation.

8. The graft device as set forth in claim 1, a second spiral pattern for strain-relief or kink-resistance over a length of the outer layer.

* * * * *